(12) United States Patent
Arimoto

(10) Patent No.: US 8,130,208 B2
(45) Date of Patent: *Mar. 6, 2012

(54) IMAGE-SELECTING DEVICE AND IMAGE-SELECTING METHOD

(75) Inventor: Hideki Arimoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 803 days.

This patent is subject to a terminal disclaimer.

(21) Appl. No.: 12/213,132

(22) Filed: Jun. 16, 2008

(65) Prior Publication Data

US 2008/0309644 A1 Dec. 18, 2008

(30) Foreign Application Priority Data

Jun. 14, 2007 (JP) ................. P2007-157011

(51) Int. Cl.
*G06F 3/041* (2006.01)
(52) U.S. Cl. ........................ 345/173; 715/822
(58) Field of Classification Search .......... 345/173–178; 715/810, 821, 822, 831; 178/18.01
See application file for complete search history.

(56) References Cited

U.S. PATENT DOCUMENTS

| 7,176,899 | B2 | 2/2007 | Nagasaka et al. | |
|---|---|---|---|---|
| 2004/0021701 | A1* | 2/2004 | Iwema et al. | 345/863 |
| 2004/0046886 | A1 | 3/2004 | Ambiru et al. | |
| 2007/0229471 | A1* | 10/2007 | Kim et al. | 345/173 |

FOREIGN PATENT DOCUMENTS

| JP | 10063409 A * | 3/1998 |
|---|---|---|
| JP | 2001-175407 A | 6/2001 |
| JP | 2004-152171 A | 5/2004 |
| JP | 2005-072758 A | 3/2005 |
| JP | 2005-092386 | 4/2005 |
| JP | 2006-163805 A | 6/2006 |
| JP | 2006319389 A * | 11/2006 |

OTHER PUBLICATIONS

Japan Patent Office, Office Action for Japanese Patent Application No. 2007-157011, mailed Feb. 15, 2011.

* cited by examiner

*Primary Examiner* — Stephen Sherman
(74) *Attorney, Agent, or Firm* — Baker Botts L.L.P.

(57) ABSTRACT

An image-selecting device includes a storing unit, a displaying unit, a detecting unit, a reading unit, an identification data storing unit, a display controlling unit, an image data identifying unit, and an image data selecting unit. The displaying unit displays a plurality of images based on a plurality of pieces of image data and has a plurality of display regions for the plurality of images. The detecting unit detects each of the plurality of display regions receiving direct input by an indicator. The reading unit reads the plurality of pieces of image data from the storing unit. The identification data storing unit stores identification data for identifying the plurality of pieces of image data read by the reading unit and assigns a prescribed order to the identification data for the plurality of pieces of image data. The display controlling unit controls the displaying unit to display the plurality of images according to the prescribed order. The image data identifying unit identifies each of the plurality of pieces of image data for the image displayed in the display region detected by the detecting unit. When the image data identifying unit identifies two pieces of image data among the plurality of pieces of image data, the image data selecting unit, selects or deselects image data from one image data of the two pieces of image data to the other image data of the two pieces of image data according to the prescribed order of the identification data.

14 Claims, 19 Drawing Sheets

FIG.3A

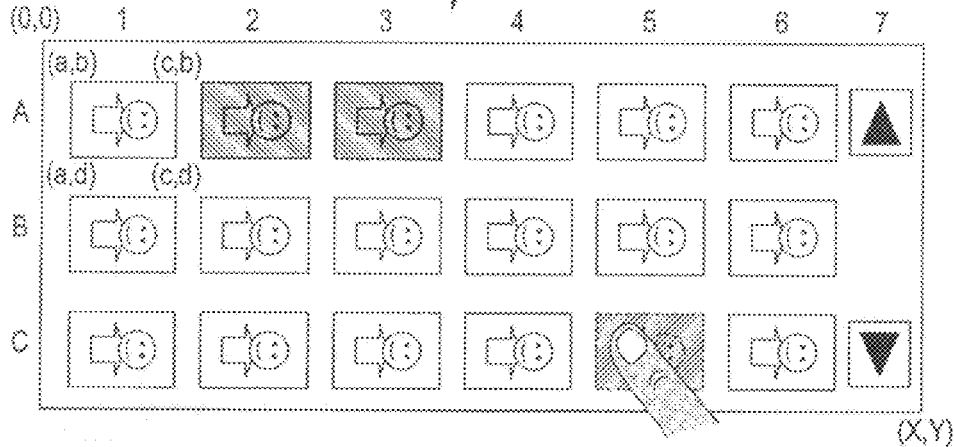

SAMPLE RELATIONSHIP BETWEEN THUMBNAILS DISPLAYED ON LCD 16 AND THEIR DISPLAY POSITION NUMBERS

FIG.3B

SAMPLE CONTENT OF THUMBNAIL LIST MEMORY AREA 13B

| REFERENCE NUMBER | DISPLAY POSITION NUMBER | IMAGE FILENAME | STATUS STATUS FLAG |
|---|---|---|---|
| 1 | A1 | PHOTO1.JPG | × |
| 2 | A2 | PHOTO2.JPG | ○ |
| 3 | A3 | PHOTO3.JPG | ○ |
| 4 | A4 | PHOTO4.JPG | × |
| 5 | A5 | PHOTO5.JPG | × |
| 6 | A6 | PHOTO6.JPG | × |
| : | : | : | : |
| 17 | C5 | PHOTO17.JPG | × |
| : | : | : | : |

○ ‥ SELECTED
× ‥ UNSELECTED

FIG.3C

SAMPLE CONTENT OF TEMPORARY SELECTION LIST MEMORY AREA 13C

| REFERENCE NUMBER |
|---|
| 17 |

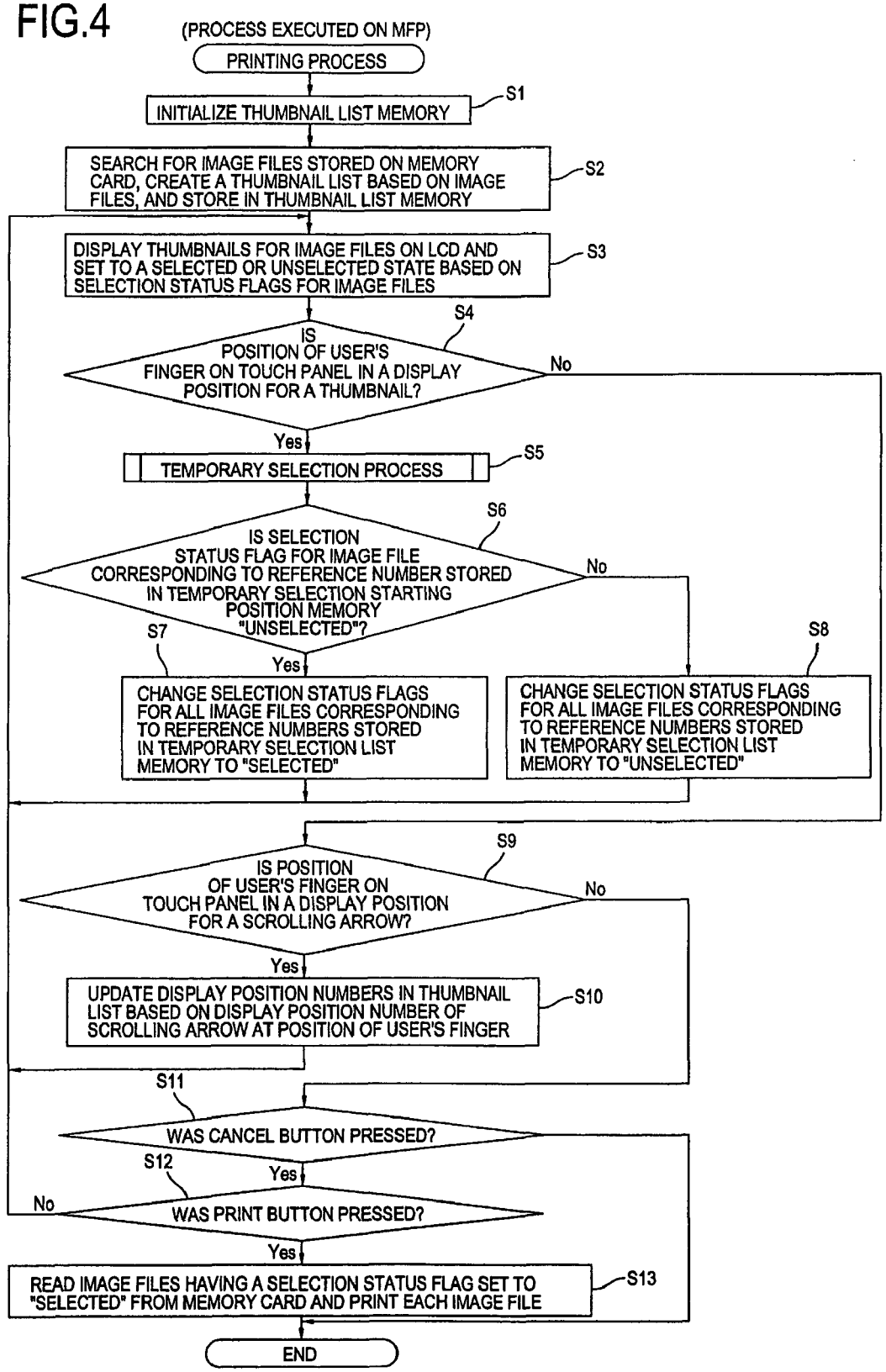

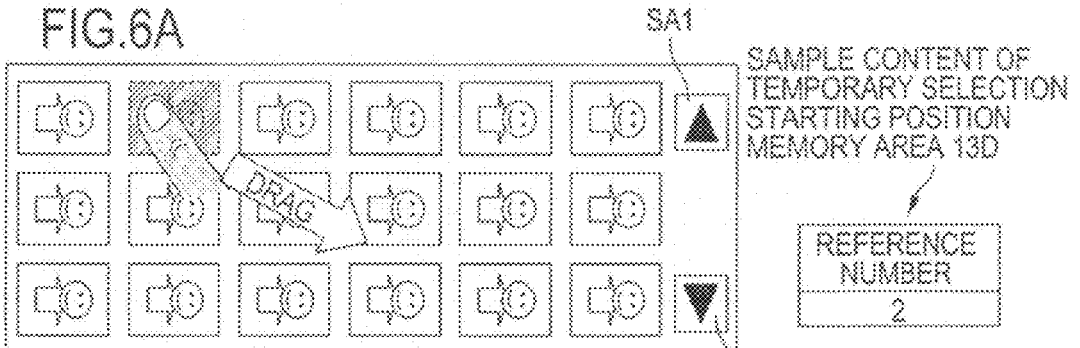
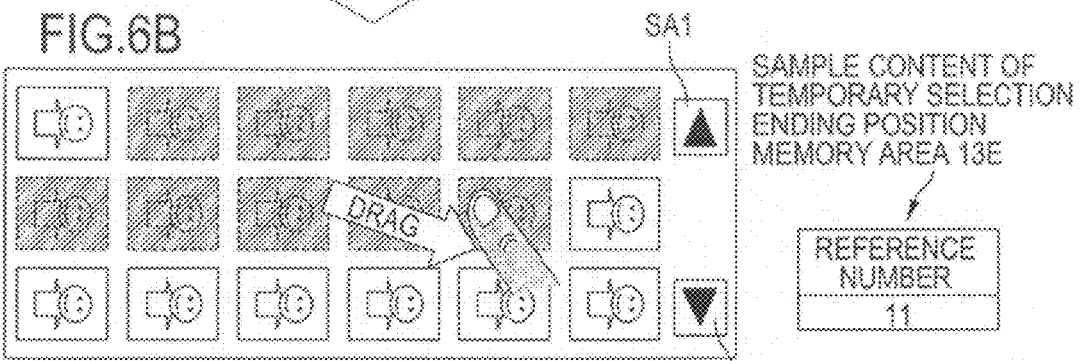
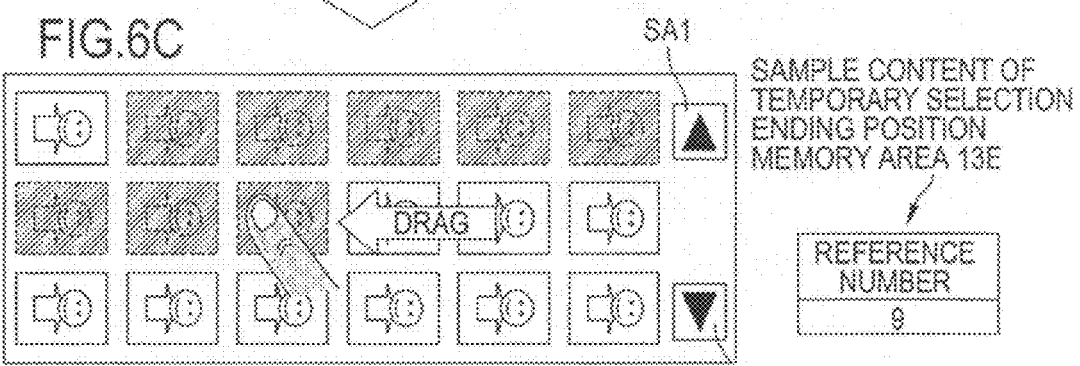
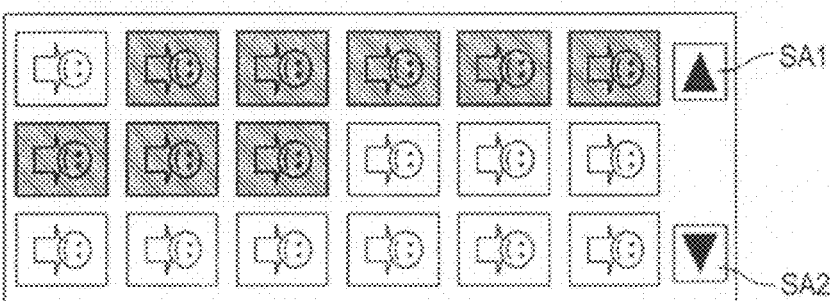

FIG.7A

SAMPLE CONTENT OF THUMBNAIL LIST MEMORY AREA 13B

| REFERENCE NUMBER | DISPLAY POSITION NUMBER | IMAGE FILENAME | STATUS STATUS FLAG |
|---|---|---|---|
| 1 | A1 | PHOTO1.JPG | × |
| 2 | A2 | PHOTO2.JPG | × |
| 3 | A3 | PHOTO3.JPG | × |
| 4 | A4 | PHOTO4.JPG | × |
| 5 | A5 | PHOTO5.JPG | × |
| 6 | A6 | PHOTO6.JPG | × |
| ⋮ | ⋮ | ⋮ | ⋮ |

FIG.7B

SAMPLE CONTENT OF TEMPORARY SELECTION LIST MEMORY AREA 13C

| REFERENCE NUMBER |
|---|
| 2 |
| 3 |
| 4 |
| ⋮ |
| 10 |
| 11 |

FIG.7C

SAMPLE CONTENT OF TEMPORARY SELECTION LIST MEMORY AREA 13C

| REFERENCE NUMBER |
| --- |
| 2 |
| 3 |
| 4 |
| ⋮ |
| 8 |
| 9 |

FIG.7D

SAMPLE CONTENT OF THUMBNAIL LIST MEMORY AREA 13B

| REFERENCE NUMBER | DISPLAY POSITION NUMBER | IMAGE FILENAME | STATUS STATUS FLAG |
| --- | --- | --- | --- |
| 1 | A1 | PHOTO1.JPG | × |
| 2 | A2 | PHOTO2.JPG | ○ |
| 3 | A3 | PHOTO3.JPG | ○ |
| 4 | A4 | PHOTO4.JPG | ○ |
| 5 | A5 | PHOTO5.JPG | ○ |
| ⋮ | ⋮ | ⋮ | ⋮ |
| 9 | B3 | PHOTO9.JPG | ○ |
| 10 | B4 | PHOTO10.JPG | × |
| 11 | B5 | PHOTO11.JPG | × |
| ⋮ | ⋮ | ⋮ | ⋮ |

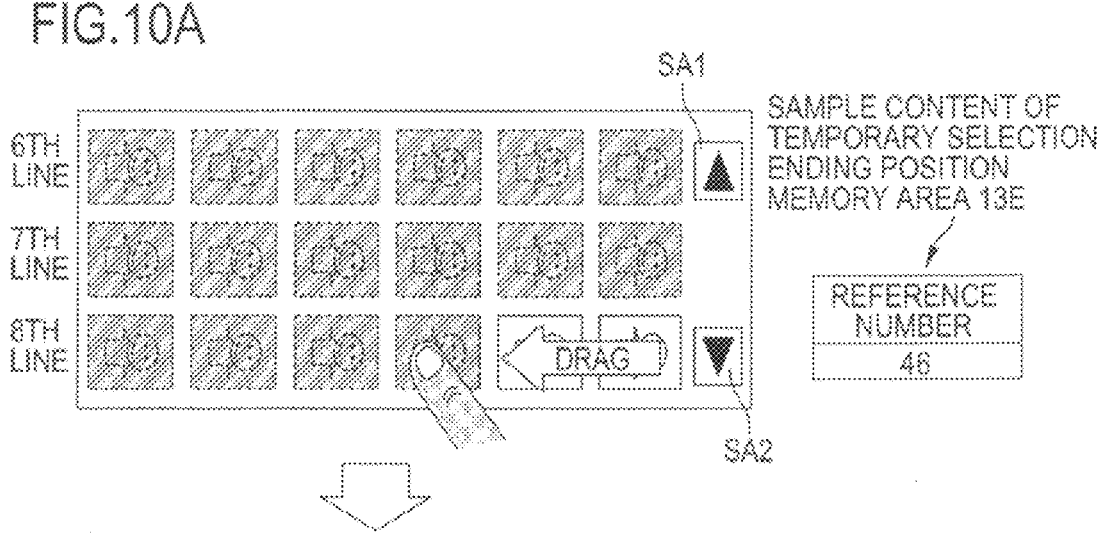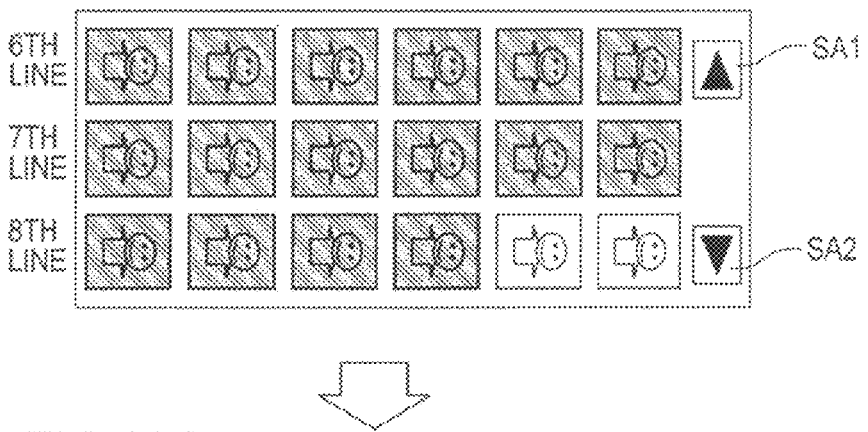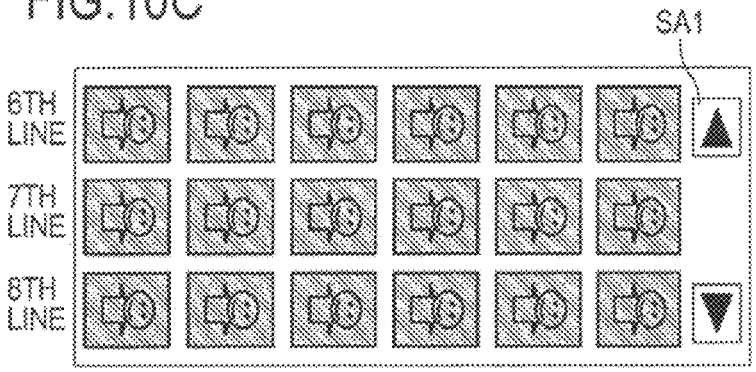

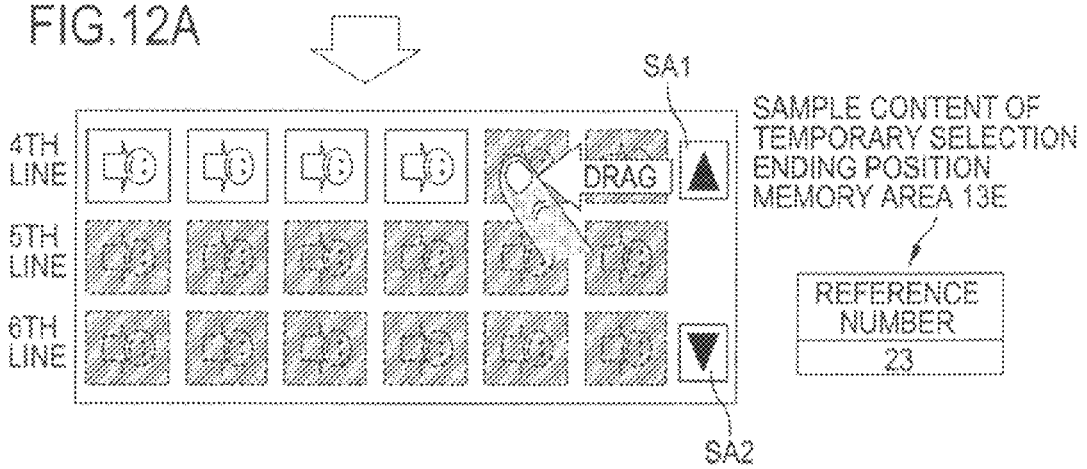
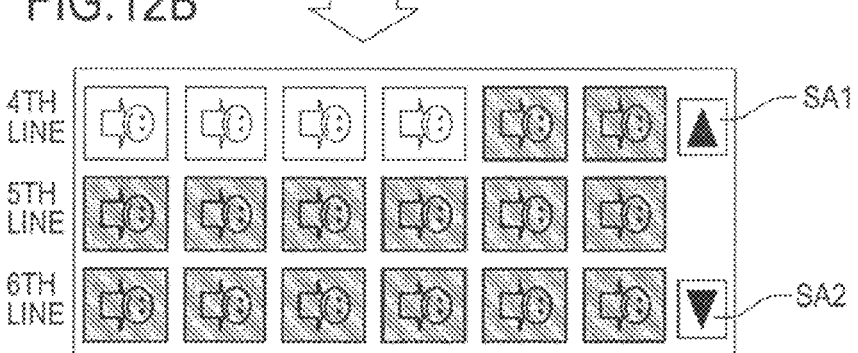
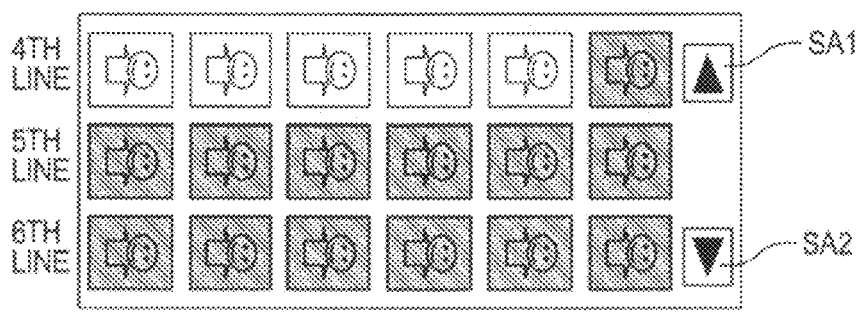

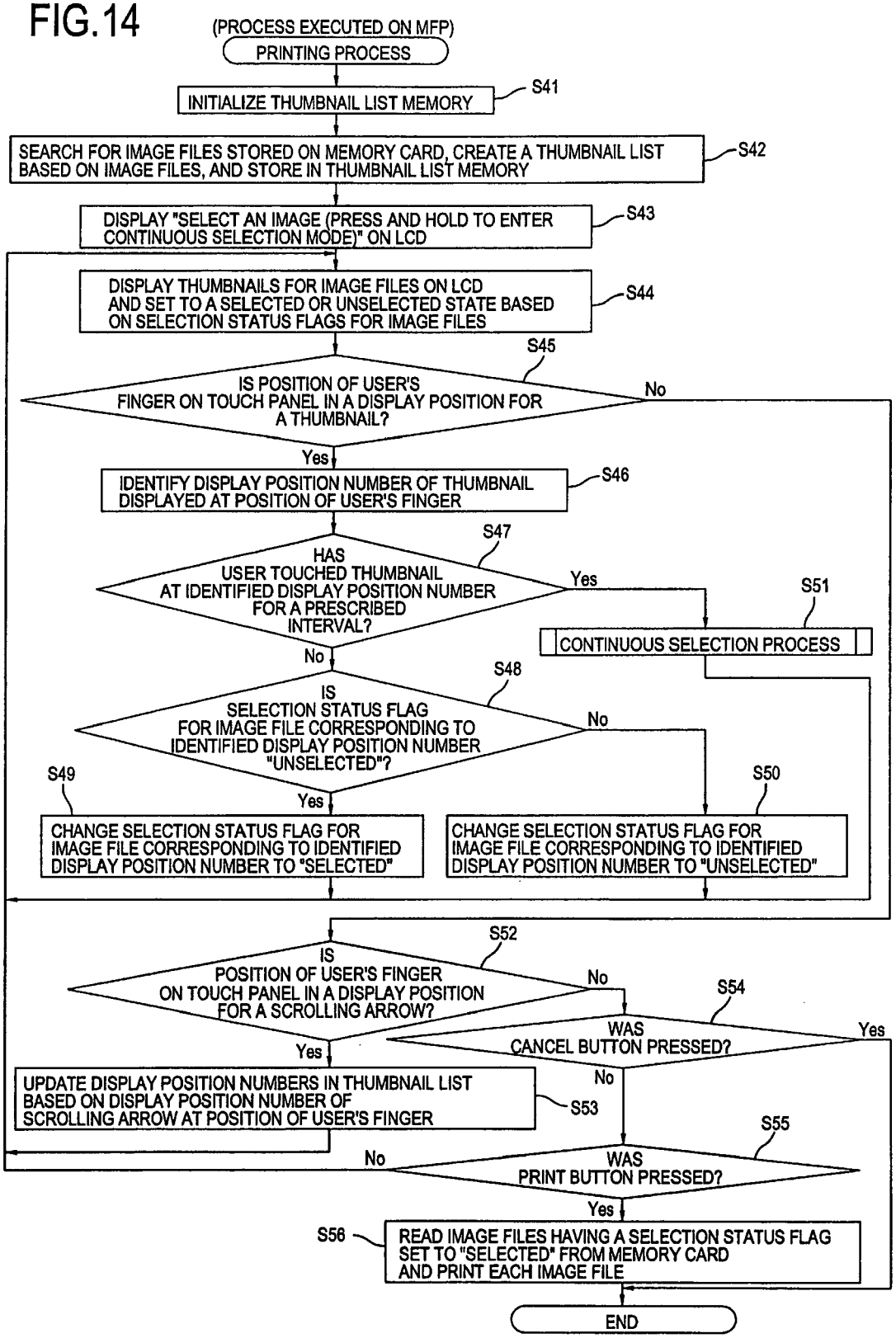

IMAGE-SELECTING DEVICE AND IMAGE-SELECTING METHOD

CROSS REFERENCE TO RELATED APPLICATION

This application claims priority from Japanese Patent Application No. 2007-157011 filed Jun. 14, 2007. The entire content of the priority application is incorporated herein by reference.

TECHNICAL FIELD

The present invention relates to an image-selecting device and an image-selecting method. More particularly, the present invention relates to an image selecting device and an image selecting method enabling the user to select or deselect a plurality of desired image data from a plurality of images displayed on a display device through simple operations.

BACKGROUND

There is known an image-selecting device that is provided with a touch panel arranged on a display screen on a display on which a plurality of images are displayed. Then, when a user touches the touch panel by a finger, an image corresponding to the touched position on the touch panel is selected. Japanese Patent Application Publication No. 2005-92386 discloses that an image-selecting device is capable of selecting the image data for the images in a path traced by the finger from a position where the finger touches the touch panel to a position where the finger is removed from the touch panel.

SUMMARY

However, since the image-selecting device disclosed in Japanese Patent Application Publication No. 2005-92386 selects only the image data for the images in the path traced by the finger on the touch panel, the user must touch each image individually when selecting numerous images, resulting in tedious operations for the user.

In view of the foregoing, it is an object of the present invention to provide an image-selecting device and an image-selecting method enabling the user to select or deselect a plurality of desired image data from a plurality of images displayed on a display device through simple operations.

To achieve the above and other objects, one aspect of the invention provides an image-selecting device including a storing unit, a displaying unit, a detecting unit, a reading unit, an identification data storing unit, a display controlling unit, an image data identifying unit, and an image data selecting unit. The storing unit stores a plurality of pieces of image data. The displaying unit displays a plurality of images based on a plurality of pieces of image data and has a plurality of display regions for the plurality of images. The detecting unit detects each of the plurality of display regions receiving direct input by an indicator. The reading unit reads the plurality of pieces of image data from the storing unit. The identification data storing unit stores identification data for identifying the plurality of pieces of image data read by the reading unit and assigns a prescribed order to the identification data for the plurality of pieces of image data. The display controlling unit controls the displaying unit to display the plurality of images according to the prescribed order. The image data identifying unit identifies each of the plurality of pieces of image data for the image displayed in the display region detected by the detecting unit. When the image data identifying unit identifies two pieces of image data among the plurality of pieces of image data, the image data selecting unit, selects or deselects image data from one image data of the two pieces of image data to the other image data of the two pieces of image data according to the prescribed order of the identification data.

In another aspect of the present invention, there is provided an image-selecting method for an image-selecting device including a storing unit that stores a plurality of pieces of image data, a displaying unit that displays a plurality of images based on the plurality of pieces of image data and has a plurality of display regions for each of the plurality of images, a detecting unit that detects each of the plurality of display regions receiving direct input by an indicator, and an identification data storing unit. The image-selecting method includes:

reading the plurality of pieces of image data from the storing unit;

storing identification data for identifying the plurality of pieces of image data read in the reading step and assigning a prescribed order to the identification data for the plurality of pieces of image data;

controlling the displaying unit to display the plurality of images according to the prescribed order;

identifying each of the plurality of pieces of image data for the image displayed in the display region detected by the detecting unit; and selecting or deselecting, when two pieces of image data among the plurality of pieces of image data is identified in the image data identifying step, image data from one image data of the two pieces of image data to the other image data of the two pieces of image data according to the prescribed order of the identification data.

BRIEF DESCRIPTION OF THE DRAWINGS

In the drawings:

FIG. 3A is an explanatory diagram showing a sample relationship between thumbnails of image files displayed on an LCD and their display position numbers;

FIG. 3B is a table showing sample content of a thumbnail list stored in a thumbnail memory area;

FIG. 3C is a table showing sample content of a temporary selection list stored in a temporary selection list memory area;

FIG. 4 is a flowchart illustrating steps in a printing process performed on the multifunction peripheral according to the first embodiment;

FIGS. 6A-6D are explanatory diagrams illustrating a method of selecting image files by touching a touch panel and tracing a path over thumbnails displayed on the LCD;

FIGS. 7A-7D are tables showing the content of the thumbnail list memory area and the temporary selection memory area modified according to the operation in FIG. 6;

FIGS. 10A-10C are explanatory diagrams illustrating a method of selecting images files by operating the scrolling arrow SA2 to scroll thumbnails displayed on the LCD;

FIGS. 12A-12C are explanatory diagrams illustrating a method of selecting images files by operating the scrolling arrow SA1 to scroll thumbnails displayed on the LCD;

FIG. 14 is a flowchart illustrating steps in a printing process executed by the multifunction peripheral according to a second embodiment;

DETAILED DESCRIPTION

Figure 1:
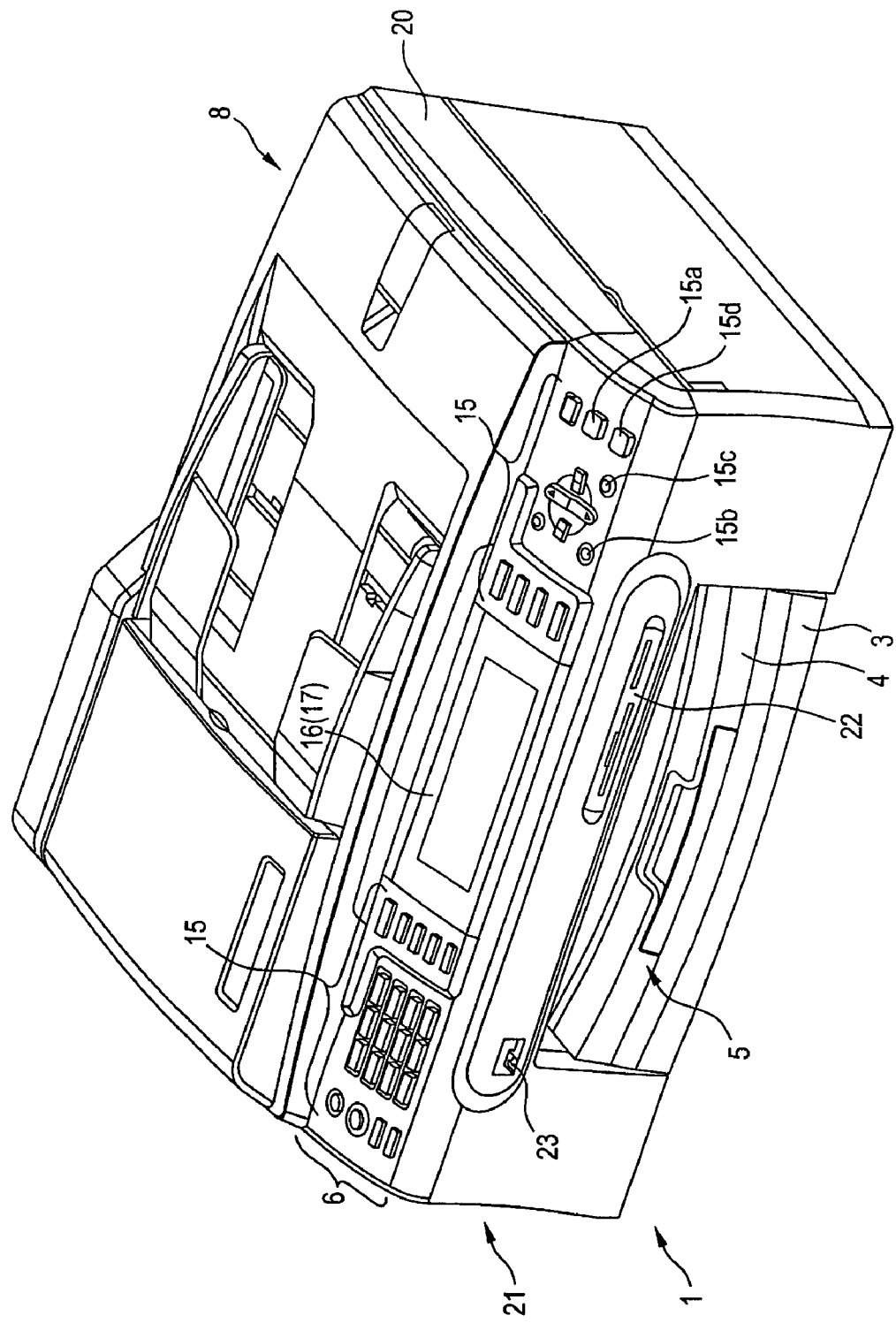
FIG. 1 is a perspective view showing the external structure of a multifunction peripheral according to a first embodiment of the present invention.

Next, a first embodiment of the present invention will be described while referring to the accompanying drawings. FIG. 1 is a perspective view showing the external structure of a multifunction peripheral (hereinafter abbreviated to "MFP") 1 having an image-selecting device according to the embodiment of the present invention.

As shown in FIG. 1, the MFP 1 is integrally provided with a printer 21 disposed in a lower section thereof, a scanner 20 disposed in an upper section thereof, and a control panel 6 disposed on the front surface of the scanner 20. Through these components, the MFP 1 implements various functions, including a printer function, scanner function, and copier function.

The scanner 20 includes a document scanning bed (not shown), and a document cover 8 rotatably attached to the document scanning bed via hinges provided on the rear side.

The printer 21 functions to record images on printing paper. An opening 5 is formed in the front surface of the MFP 1, and specifically in the front surface of the printer 21. A paper tray 3 and a discharge tray 4 are disposed in the opening 5 so as to be completely accommodated therein. The paper tray 3 and discharge tray 4 are arranged in two levels vertically, with the discharge tray 4 disposed above the paper tray 3.

Memory card slots 22 are provided in the front surface of the printer 21 above the opening 5. The memory card slots 22 accept the insertion of memory cards 22a (see FIG. 2). When a memory card 22a is inserted into one of the memory card slots 22, the MFP 1 can store image data scanned by the scanner 20 in the memory card 22a as an image file. Some examples of the types of memory cards 22a that may be inserted into the memory card slots 22 include CompactFlash (registered trademark), SmartMedia (registered trademark), Memory Stick (registered trademark), SD Card (registered trademark), and xD Card (registered trademark).

The connector of a USB interface 23 is also exposed in the front surface of the printer 21 above the opening 5. The MFP 1 can be connected to a personal computer (hereinafter abbreviated to "PC") by inserting one end of a USB cable (not shown) into the connector of the USB interface 23 and the other end of the USB cable into the connector of a USB interface provided in the PC, enabling the MFP 1 and the PC to communicate via the USB cable. The method of connecting the PC and the memory card 22a to the MFP 1 is not limited to a specific interface (i.e., the USB interface 23 and the memory card slots 22), but may be established through another type of interface, such as a parallel interface or network interface, provided in the MFP 1. Further, if the memory card 22a is connected to a card slot or USB interface provided in another device, the MFP 1 may connect to the memory card 22a via the above interfaces.

Figure 2:
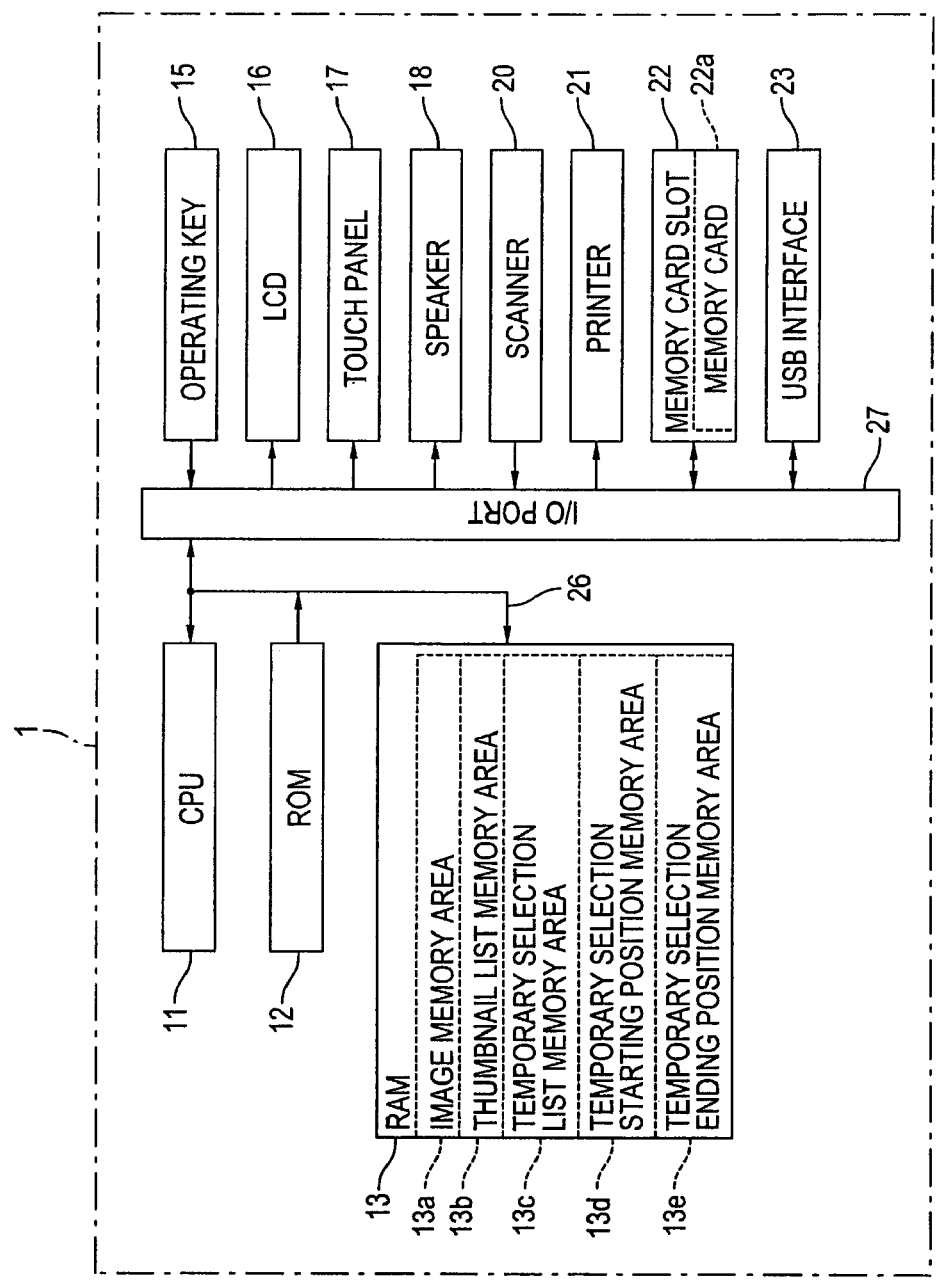
FIG. 2 is a block diagram showing the electrical structure of the multifunction peripheral.

The control panel 6 provided on the front of the document cover 8 has a laterally elongated rectangular shape and includes operating keys 15, an LCD 16, a touch panel 17, and a speaker 18 (see FIG. 2).

The operating keys 15 allow the user to input commands and data for controlling the MFP 1. In this embodiment, the operating keys 15 include a Print Image File button 15a, a Cancel button 15b, and a Print button 15c.

The touch panel 17 is an input device superposed over the surface of the LCD 16. The user touches the touch panel 17 to select images and the like displayed on the LCD 16. For example, when thumbnail images (hereinafter simply referred to as "thumbnails") are displayed on the LCD 16 and the user touches the touch panel 17, the touch panel 17 identifies a thumbnail displayed at a display position on the LCD 16 corresponding to the touched position.

Here, the touch panel 17 is not limited to any particular position detecting method. For example, the MFP 1 may employ a touch panel using a pressure sensor for detecting pressure by the user's finger or an indicating device, or a touch panel employing an infrared or electric field sensor detecting proximity of a finger or indicating device.

The speaker 18 issues notifications to the user in the form of operating sounds when the user presses the operating keys 15, or warning sounds when errors occur. With the MFP 1 having the above construction, if the user presses the Print Image File button 15a while a memory card 22a storing image files is inserted into one of the memory card slots 22 provided in the front surface of the MFP 1, the MFP 1 reads all image data stored on the memory card 22a and displays thumbnails of the image data on the LCD 16. Here, thumbnails are small images formed by reducing the image files.

At this time, the user can touch the touch panel 17 with a finger to indicate a desired thumbnail among thumbnails displayed on the LCD 16. When the user touches a thumbnail on the LCD 16, the printer 21 is configured to print the image from the image file corresponding to the touched thumbnail on printing paper.

Next, the electrical structure of the MFP 1 will be described with reference to FIG. 2. FIG. 2 is a block diagram showing this electrical structure. As shown in FIG. 2, the MFP 1 is primarily configured of a CPU 11, a ROM 12, a RAM 13, the operating keys 15, the LCD 16, the touch panel 17, the speaker 18, the scanner 20, the printer 21, the memory card slots 22, and the USB interface 23. The CPU 11, ROM 12, and RAM 13 are interconnected via a bus line 26.

Further, the bus line 26 is connected to the operating keys 15, LCD 16, touch panel 17, speaker 18, scanner 20, printer 21, memory card slots 22, and USB interface 23 via an I/O port 27.

The CPU 11 of the MFP 1 serves to control the various functions of the MFP 1 based on fixed values and programs stored in the ROM 12 and RAM 13 and to control each component of the MFP 1 connected to the I/O port 27 based on various signals exchanged with the USB interface 23.

The ROM 12 is a non-rewritable memory storing control programs and the like executed on the MFP 1. The image selection program shown in the flowcharts of FIGS. 4, 5, 14, and 15 is also stored in the ROM 12.

The RAM 13 is a nonvolatile rewritable memory for temporarily storing various data when the CPU 11 executes operations of the MFP 1. The RAM 13 is provided with an image memory area 13a storing image files acquired from the memory card 22a for images to be printed by the printer 21 on printing paper; a thumbnail list memory area 13b storing a thumbnail list including such data as the filenames and reference numbers described later of image files stored in the memory card 22a; a temporary selection list memory area 13c storing reference numbers of image files identified when the user touches the touch panel 17 in a temporary selection process described later (see FIG. 5) as a temporary selection list; a temporary selection starting position memory area 13d storing the reference number of the image file initially identified in the temporary selection process; and a temporary selection ending position memory area 13e storing the reference number of the image file last identified in the temporary selection process.

Next, the thumbnail list memory area 13b, temporary selection list memory area 13c, temporary selection starting position memory area 13d, and temporary selection ending position memory area 13e will be described with reference to FIGS. 3A-3C.

FIG. 3A is an explanatory diagram conceptually illustrating an example of relationships between thumbnails for image files displayed on the LCD 16 and display position numbers. FIG. 3B is a table conceptually illustrating sample content of a thumbnail list stored in the thumbnail list memory area 13b. FIG. 3C is an explanatory diagram conceptually illustrating sample content of a temporary selection list stored in the temporary selection list memory area 13c.

The display position numbers for thumbnails displayed on the LCD 16 will be described with reference to FIG. 3A. As shown in FIG. 3A, a total of eighteen thumbnails arranged in three rows and six columns are displayed on the LCD 16. Scrolling arrows SA1 and SA2 are also displayed on the LCD 16 to the right of the thumbnails in a seventh column.

To simplify the description of display positions for thumbnails displayed on the LCD 16, the display position of the thumbnails will be referred to based on a combination of a letter and number, where letters from "A" to "C" indicate the rows of thumbnails (as well as the scrolling arrows SA1 and SA2) in order from top to bottom and numbers from "1" to "7" indicate the columns of thumbnails (as well as the scrolling arrows SA1 and SA2) in order from left to right. The combination of letters and numbers will be referred to in the following description as the display position number. For example, "A1" denotes the display position number of the thumbnail displayed in the first row and first column, and "C6" denotes the display position number of the thumbnail displayed in the third row and sixth column.

Coordinates for a two-dimensional rectangular shape are established for the LCD 16 and the touch panel 17 superposed over the surface of the LCD 16, with (0, 0) being the point of origin in the upper left corner and (X, Y) being the ending point in the lower right corner. Each of the display position numbers "A1-C7" described above is associated with separate coordinate positions on the LCD 16.

For example, the display position number "A1" is associated with a rectangular display region whose four vertices have coordinates (a, b), (a, d), (c, b), and (c, d). A thumbnail is displayed within this display region. In the same way, each of the other display position numbers "A2-C7" is associated with a separate rectangular display region. When the user touches one of the thumbnails (or the scrolling arrow SA1 or SA2) displayed on the LCD 16, the user actually touches the touch panel 17 superposed over the LCD 16. The touch panel 17 detects the coordinates at the touched position, enabling the MFP 1 to identify the image file corresponding to the thumbnail (or scrolling arrow SA1 or SA2) displayed in a position on the LCD 16 corresponding to the touched coordinates.

For example, when the user touches a position on the touch panel 17 within the rectangular region whose four vertices have coordinates (a, b), (a, d), (c, b), and (c, d), the MFP 1 identifies the image file corresponding to the thumbnail displayed at display position number "A1" of the LCD 16.

FIG. 3B conceptually illustrates sample content of a thumbnail list stored in the thumbnail list memory area 13b. When the MFP 1 executes a printing process described later with reference to FIG. 4, the MFP 1 searches for all image files stored in the memory card 22a. Subsequently, the MFP 1 creates a thumbnail list that includes the filename, reference number, and other data for each image file found when searching the memory card 22a and stores this thumbnail list in the thumbnail list memory area 13b.

As shown in FIG. 3B, the thumbnail list is configured of sequential reference numbers having no duplication, display position numbers indicating display positions of thumbnails on the LCD 16, filenames of the image files, and selection status flags indicating whether the image files are selected or unselected. Each row in the thumbnail list corresponds to a single image file.

The reference numbers are assigned sequentially to the image files based on an arbitrary order, such as the chronological order of creation dates, the alphabetical order of filenames, or the like. The display position number in the thumbnail list may be set to one of the display position numbers on the LCD 16 described above or to no value. If the display position number is set in the thumbnail list, then a thumbnail of an image file is displayed in the display position of the LCD 16 indicated by the display position number. If no value is set for the display position number in the thumbnail list, a thumbnail of an image file is not displayed on the LCD 16.

Display position numbers in the thumbnail list are assigned to image files sequentially in increasing order of the reference numbers, beginning from an arbitrary reference number in the thumbnail list. The display position numbers are assigned in order from "A1" to "A6", followed by "B1" to "B6", followed by "C1" to "C6".

In the thumbnail list shown in FIG. 3B, the row having reference number "1" is the starting position for display position numbers and, hence, the display position number in this row is set to "A1". The display position number in the next row having reference number "2" is set to "A2". In this way, the display position numbers are assigned sequentially to rows in the thumbnail list up to display position number "C6" in increasing order of the reference numbers. The case of no display position number being assigned to a row in the thumbnail list occurs when the number of image files stored in the memory card 22a exceeds the number of thumbnails that can be displayed on the LCD 16 at one time (eighteen thumbnails in this embodiment).

In such cases, the user can display thumbnails not currently displayed on the LCD 16 by touching one of the scrolling arrows SA1 and SA2 displayed in display position numbers "A7" and "C7" on the LCD 16. Thumbnails displayed on the LCD 16 are shifted one row upward when the user touches the scrolling arrow SA2 displayed at display position number "C7". In other words, the thumbnails displayed at display position numbers "B1-B6" are shifted upward to display position numbers "A1-A6"; thumbnails displayed at display position numbers "C1-C6" are shifted upward to display position numbers "B1-B6"; and new thumbnails are displayed at display position numbers "C1-C6".

More specifically, when the user touches the scrolling arrow SA2 at display position number "C7" on the LCD 16, first display position numbers "A1-C6" are modified in the thumbnail list. That is, display position number "A1" is moved to the row of the thumbnail list with reference number "7", display position number "A2" is moved to the row with reference number "8", and subsequent display position numbers are moved in the same way, with display position number "C6" being moved to the row having reference number "24". Hence, each display position number "A1-C6" stored in the thumbnail list is moved down six lines in the list. Subsequently, thumbnails for image files corresponding to the modified display position numbers "A1-C6" in the thumbnail list are displayed at display position numbers "A1-C6" on the LCD 16.

Further, when the user touches the scrolling arrow SA1 at display position number "A7", first display position numbers "A1-C6" are modified in the thumbnail list. For example, if the row with reference number "13" in the thumbnail list is the starting position for display position numbers and, hence, has display position number "A1", display position number "A2" is set to the next row with reference number "14", and subsequent display position numbers are set sequentially in increasing order of reference numbers. When the user touches the scrolling arrow SA1 at display position number "A7", display position number "A1" is moved to the row with reference number "7", display position number "A2" is moved to the row with reference number "8", and subsequent display position numbers are moved similarly, with display position number "C6" being moved to the row having reference number "24". Hence, each display position number "A1-C6" stored in the thumbnail list is moved up six lines in the list.

Hence, thumbnails displayed on the LCD 16 are moved downward one line. That is, the thumbnails displayed at display position numbers "A1-A6" are shifted to display position numbers "B1-B6"; thumbnails displayed at display position numbers "B1-B6" are shifted to display position numbers "C1-C6"; and new thumbnails are displayed at display position numbers "A1-A6".

The selection status flag indicates whether the image file is "selected" or "unselected." When the selection status flag is "selected," the thumbnail of the image file is highlighted on the LCD 16, as are thumbnails at display position numbers "A2" and "A3" in the example of FIG. 3A. When the selection status flag is set to "unselected" or is modified from "selected" to "unselected," the corresponding thumbnail displayed on the LCD 16 is not highlighted, as in the thumbnail at display position number "A1" in the example of FIG. 3A. In the following description, highlighted thumbnails will be referred to as thumbnails displayed in a selected state, while unhighlighted thumbnails will be referred to as thumbnails displayed in an unselected state.

FIG. 3C is an explanatory diagram conceptually illustrating sample content of the temporary selection list stored in the temporary selection list memory area 13c. When the user touches the touch panel 17, the MFP 1 identifies the image file corresponding to the thumbnail displayed on the LCD 16 at a position identical to the coordinate position touched on the touch panel 17. Further, if the user continues to touch the touch panel 17 with a finger while moving the position of the finger, the MFP 1 identifies the image file corresponding to the thumbnail displayed at the position of the LCD 16 having coordinates corresponding to the coordinate position of the moved finger.

The temporary selection starting position memory area 13d stores the reference number of the image file initially identified while the user's finger was touching the touch panel 17. The temporary selection ending position memory area 13e stores the reference number of the image file identified from the coordinates at the new position when the user's finger moves to a new position while remaining in contact with the touch panel 17.

The temporary selection list memory area 13c stores each reference number in the thumbnail list ranging in succession from the reference number stored in the temporary selection starting position memory area 13d to the reference number stored in the temporary selection ending position memory area 13e. Thumbnails for image files corresponding to reference numbers stored in the temporary selection list memory area 13c are displayed on the LCD 16 in a format different from that for selected and unselected thumbnails, such as the format for the thumbnail at display position number "C5" in the example of FIG. 3A. In the following description, thumbnails in this format differing from the format for selected and unselected thumbnail displays will be referred to as thumbnails displayed in a temporarily selected state.

For example, if the user touches the thumbnail at display position number "C5" on the touch panel 17, as shown in FIG. 3A, reference number "17" of the image file corresponding to the touched thumbnail is stored in both the temporary selection starting position memory area 13d and the temporary selection list memory area 13c. As long as the user continues to touch the touch panel 17, the thumbnail for the image file corresponding to reference number "17" stored in the temporary selection list memory area 13c is displayed on the LCD 16 in the temporarily selected state.

Next, the printing process executed by the CPU 11 of the MFP 1 will be described with reference to FIG. 4. FIG. 4 is a flowchart illustrating steps in this printing process and is executed when the user presses the Print Image File button 15a while a memory card 22a is inserted into one of the memory card slots 22.

In this printing process, the user can select desired image files from those stored in the memory card 22a through simple operations and direct the printer 21 to print images on printing paper based on the selected image files. Accordingly, the MFP 1 can select desired image files from those stored in the memory card 22a through simple operations and direct the printer 21 to print images on printing paper based on the selected image files.

In S1 of the printing process, the CPU 11 initializes the thumbnail list memory area 13b. In S2 the CPU 11 searches the memory card 22a for all image files, creates a thumbnail list based on the image files found in this search, and stores the thumbnail list in the thumbnail list memory area 13b. When the thumbnail list is created (i.e., when in its initial state), selection status flags for all image files are set to "unselected." Further, "A1" is set as the display position number in the line having reference number "1" in the thumbnail list, "A2" is set as the display position number in the line having reference number "2", and subsequently display position numbers are set sequentially in increasing order of the reference numbers up to display position number "C6".

In S3 the CPU 11 displays thumbnails on the LCD 16 for image files corresponding to display position numbers "A1-C6" in the thumbnail list stored in the thumbnail list memory area 13b and sets each thumbnail to the selected state or the unselected state based on the selection status flag for the corresponding image file.

In S4 the CPU 11 determines whether the position of the user's fingers touching the touch panel 17 is a display position on the LCD 16 for displaying a thumbnail. If the position of the user's finger on the touch panel 17 is a display position for a thumbnail (S4: YES), the CPU 11 executes a temporary selection process in S5. However, if the position of the user's finger does not correspond to a display position for a thumbnail (S4: NO), the CPU 11 skips S5-S8 and advances to S9.

Figure 5:
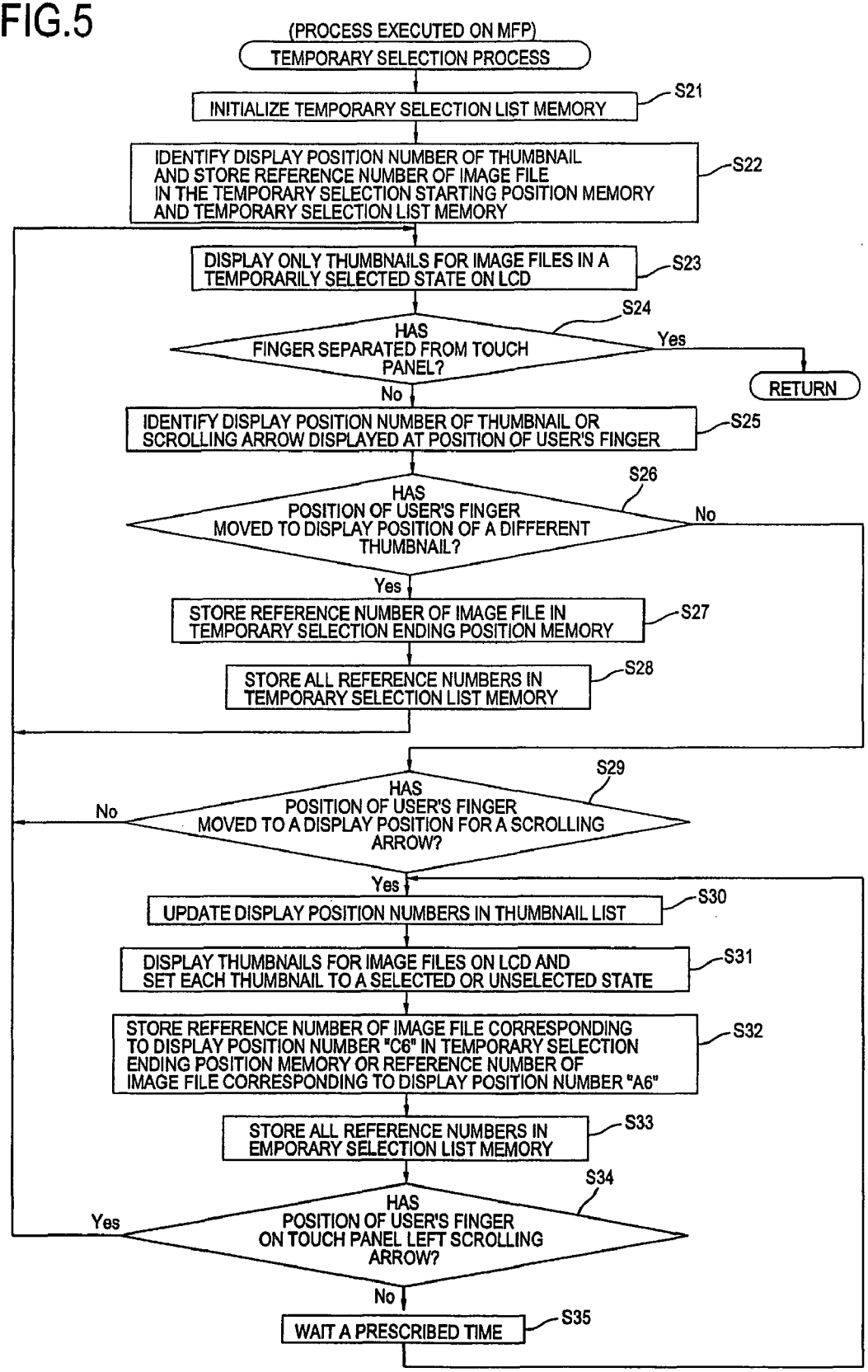
FIG. 5 is a flowchart illustrating steps in a temporary selection process performed on the multifunction peripheral.

Here, the temporary selection process of S5 will be described with reference to FIG. 5. FIG. 5 is a flowchart illustrating steps in the temporary selection process and serves to determine reference numbers of image files whose selection status flags have changed in the thumbnail list and the range of reference numbers for image files whose selection status flags have changed based on the position of the user's finger on the touch panel 17. During the period that the CPU 11 is executing the temporary selection process, thumbnails for image files corresponding to reference numbers stored in the temporary selection list memory area 13c are set to the temporarily selected state on the LCD 16.

In S21 at the beginning of the temporary selection process, the CPU 11 initializes the temporary selection list memory area 13c. In S22 the CPU 11 identifies the display position number of the thumbnail displayed at the display position on the LCD 16 identical to the position of the user's finger on the touch panel 17 and stores the reference number of the image file corresponding to the identified display position number in both the temporary selection starting position memory area 13d and the temporary selection list memory area 13c. In S23 the CPU 11 sets only thumbnail of image file corresponding to the reference number stored in the temporary selection list memory area 13c to the temporarily selected state on the LCD 16.

In S24 the CPU 11 determines whether the user's fingers has separated from the touch panel 17. If the user's finger has separated from the touch panel 17 (S24: YES), the CPU 11 ends the temporary selection process and advances to S6 in FIG. 4.

However, if the user's finger is still touching the touch panel 17 (S24: NO), in S25 the CPU 11 identifies the display position number of the thumbnail, or scrolling arrow SA1 or SA2 displayed at the display position on the LCD 16 corresponding to the position of the user's finger on the touch panel 17.

In S26 the CPU 11 determines whether the position of the user's finger on the touch panel 17 has moved to the display position of a different thumbnail. If the user's finger has moved to the display position of a different thumbnail (S26: YES), then in S27 the CPU 11 stores the reference number of the image file corresponding to the display position number identified in S25 in the temporary selection ending position memory area 13e.

In S28 the CPU 11 stores all reference numbers in sequence from the reference number stored in the temporary selection starting position memory area 13d to the reference number stored in the temporary selection ending position memory area 13e in the temporary selection list memory area 13c, and subsequently returns to S23 to repeat the process in S23-S28 described above. However, if the CPU 11 determines in S26 that the position of the user's finger touching the touch panel 17 has not moved to the display position of a different thumbnail (S26: NO), then the CPU 11 skips S27-S28 and advances to S29.

In S29 the CPU 11 determines whether the position of the user's finger on the touch panel 17 has moved to a display position for one of the scrolling arrows SA1 and SA2. If the position of the user's finger has not moved to a display position for one of the scrolling arrows SA1 and SA2 (S29: NO), then the CPU 11 repeats the process in S23-S29 described above. However, if the position of the user's finger has moved to a display position for one of the scrolling arrows SA1 and SA2 (S29: YES), in S30 the CPU 11 updates the display position numbers in the thumbnail list based on the display position number for the scrolling arrow SA1 or SA2 displayed on a position of the LCD 16 corresponding to the finger touching the touch panel 17.

In S31 the CPU 11 displays thumbnails of image files corresponding to the display position numbers in the thumbnail list on the LCD 16 and sets each thumbnail to a selected state or an unselected state based on the selection status flag of the corresponding image file. Next, in S32 the CPU 11 stores the reference number of the image file corresponding to display position number "C6" in the thumbnail list in the temporary selection ending position memory area 13e if the position of the user's finger on the touch panel 17 corresponds to the display position of the scrolling arrow SA2 having display position number "C7", and stores the reference number of the image file corresponding to display position number "A6" in the temporary selection ending position memory area 13e if the position of the user's finger corresponds to the display position of the scrolling arrow SA1 having display position number "A7".

In S33 the CPU 11 stores in the temporary selection list memory area 13c all reference numbers in a continuous range from the reference number stored in the temporary selection starting position memory area 13d to the reference number stored in the temporary selection ending position memory area 13e. In S34 the CPU 11 determines whether the position of the user's finger on the touch panel 17 has moved outside the scrolling arrow SA1 or SA2. If the user's finger continues to touch the display position of the scrolling arrow SA1 or SA2 (S34: NO), in S35 the CPU 11 waits for a prescribed time (2 seconds, for example) and returns to S30 to repeat the process in S30-S35 described above.

However, if the user's finger has moved outside the display positions of the scrolling arrows SA1 and SA2 (S34: YES), then the CPU 11 returns to S23 and repeats the process in S23-S34 described above.

Through the temporary selection process of S5 shown in FIG. 5, the MFP 1 can specify either a reference number for an image file whose selection status flag has changed in the thumbnail list, or a range of reference numbers for image files whose selection status flags have changed, based on the position of the user's finger on the touch panel 17. Further, while executing the temporary selection process, the MFP 1 can display thumbnails of image files corresponding to reference numbers stored in the temporary selection list memory area 13c in a temporarily selected state on the LCD 16. After completing the temporary selection process of S5, the CPU 11 returns to FIG. 4 and advances to S6.

In S6 of FIG. 4 the CPU 11 determines whether the selection status flag for the image file corresponding to the reference number stored in the temporary selection starting position memory area 13d is set to "unselected." If the selection status flag for this image file is "unselected" (S6: YES), then in S7 the CPU 11 changes selection status flags for all image files corresponding to reference numbers stored in the temporary selection list memory area 13c to "selected" in the thumbnail list stored in the thumbnail list memory area 13b. However, if the selection status flag for the image file corresponding to the reference number stored in the temporary selection starting position memory area 13d is set to "selected" (S6: NO), in S8 the CPU 11 changes the selection status flags for all image files corresponding to reference numbers stored in the temporary selection list memory area 13c to "unselected" in the thumbnail list stored in the thumbnail list memory area 13b. Subsequently, the CPU 11 returns to S3 and repeats the process in S3-S8 described above.

If the CPU 11 determines in S4 that the position of the user's finger on the touch panel 17 does not correspond to a display position of a thumbnail on the LCD 16 (S4: NO), then the CPU 11 skips S5-S8 and advances to S9. In S9 the CPU 11 determines whether the position of the user's finger on the touch panel 17 corresponds to a display position for the scrolling arrow SA1 or SA2.

If the position of the user's finger does correspond to a display position for either the scrolling arrow SA1 or SA2 (S9: YES), in S10 the CPU 11 updates the display position numbers in the thumbnail list based on the display position number of the scrolling arrow SA1 or SA2 displayed at the position of the user's finger. However, if the user's finger is not at a display position of the scrolling arrow SA1 or SA2 (S9: NO), the CPU 11 skips S10 and advances to S11.

In S11 the CPU 11 determines whether the Cancel button 15b has been pressed. If the Cancel button 15b has been pressed (S11: YES), the CPU 11 ends the printing process. However, if the Cancel button 15b has not been pressed (S11: NO), in S12 the CPU 11 determines whether the Print button 15c has been pressed.

If the CPU 11 determines that the Print button 15c has been pressed (S12: YES), in S13 the CPU 11 reads image files having a selection status flag set to "selected" in the thumbnail list stored in the thumbnail list memory area 13b from the memory card 22a, stores these image files in the image memory area 13a, controls the printer 21 to print an image of each file on printing paper, and subsequently ends the printing process. However, if the Print button 15c has not been pressed (S12: NO), the CPU 11 returns to S3 and repeats the process in S3-S12 described above.

Through the printing process of FIG. 4 described above, the user can specify two image files through a simple operation of sliding a finger over thumbnails displayed on the LCD 16 and then lifting the finger therefrom. Specifically, the image file corresponding to the thumbnail first touched by the user and the image file corresponding to the thumbnail last touched by the user are set as the two image files, and all image files with reference numbers ranging in sequence from the reference number for the image file corresponding to the first touched thumbnail to the reference number for the image file corresponding to the last touched thumbnail are specified. All image files within this specified range are either selected or deselected.

Specifically, if the selection status flag of the image file corresponding to the first touched thumbnail is "unselected," selection status flags for all image files within the range specified by sliding a finger over the thumbnails are set to "selected." If the selection status flag for the image file corresponding to the first touched thumbnail is "selected" initially, then selection status flags for all image files within the specified range are set to "unselected." In other words, the selection status flags for all image files within the range specified by the user's sliding finger are set based on the selection status flag for the image file corresponding to the first touched thumbnail, enabling the user to perform the process through a simple, easy-to-understand operation.

Next, a method of operating the touch panel 17 will be described with reference to FIGS. 6A-13H. First, a method of selecting image files in which the user traces a path over thumbnails while touching the touch panel 17 will be described with reference to FIGS. 6A-7D.

FIGS. 6A-6D are explanatory diagrams illustrating a method in which the user selects image files by touching the touch panel 17 with a finger and tracing the finger over thumbnails. FIGS. 7A-7D conceptually illustrate the content of the thumbnail list memory area 13b and temporary selection list memory area 13c that changes according to the operation shown in FIGS. 6A-6D.

When the user presses the Print Image File button 15a of the operating keys 15 while a memory card 22a storing image files is inserted into one of the memory card slots 22, thumbnails for the image files stored in the memory card 22a are displayed on the LCD 16. In this description, it will be assumed that the thumbnail list memory area 13b stores the thumbnail list shown in FIG. 7A. Accordingly, thumbnails for image files corresponding to display position numbers "A1-C6" in the thumbnail list are displayed at display position numbers "A1-C6" on the LCD 16. Since the selection status flags in the thumbnail list are all set to "unselected" in FIG. 7A, the thumbnails are all displayed on the LCD 16 in an unselected state.

At this time the user touches the thumbnail corresponding to display position number "A2", as shown in FIG. 6A. Accordingly, the reference number "2" in the line of the thumbnail list having display position number "A2" is stored in both the temporary selection starting position memory area 13d and the temporary selection list memory area 13c. The thumbnail for the image file corresponding to reference number "2" stored in the temporary selection list memory area 13c is displayed on the LCD 16 in a temporarily selected state, as shown in FIG. 6A.

Next, the user traces a path to the thumbnail having display position number "B5" while the finger remains in contact with the touch panel 17. At this time, reference number "11" for the line having display position number "B5" in the thumbnail list is stored in the temporary selection ending position memory area 13e. Consequently, reference numbers "2-11" from reference number "2" stored in the temporary selection starting position memory area 13d to reference number "11" stored in the temporary selection ending position memory area 13e are all stored in the temporary selection list memory area 13c, as shown in FIG. 7B. Therefore, thumbnails for image files corresponding to reference numbers "2-11" stored in the temporary selection list memory area 13c are displayed on the LCD 16 in a temporarily selected state, as shown in FIG. 6B. Since the selected thumbnails remain displayed on the LCD 16 in the temporarily selected state while the user's finger remains in contact with the touch panel 17, the user can easily visualize which image files are selected.

If the user subsequently traces a path to the thumbnail at display position number "B3" while keeping the finger in contact with the touch panel 17, as shown in FIG. 6C, reference number "9" for the line having display position number "B3" in the thumbnail list is stored in the temporary selection ending position memory area 13e.

Accordingly, the range of reference numbers "2-9" from the reference number "2" stored in the temporary selection starting position memory area 13d to the reference number "9" stored in the temporary selection ending position memory area 13e are stored in the temporary selection list memory area 13c, as shown in FIG. 7C. Hence, thumbnails for image files corresponding to reference numbers "2-9" stored in the temporary selection list memory area 13c are displayed on the LCD 16 in the temporarily selected state, as shown in FIG. 6C.

The thumbnails of image files corresponding to reference numbers not stored in the temporary selection list memory area 13c are displayed on the LCD 16 based on the selection status flags in the thumbnail list. Therefore, the user can modify the range of selected image files any number of times by moving the position of the user's finger while the finger remains in contact with the touch panel 17. Since only thumbnails for selected image files are displayed in the temporarily selected state on the LCD 16, the user can easily visualize which image files are selected.

If the user lifts the finger from the touch panel 17 at this time, all selection status flags for lines having reference numbers "2-9" in the temporary selection list memory area 13c are set to "selected" in the thumbnail list, as shown in FIG. 7D, because the selection status flag is set to "unselected" in the line having reference number "2" stored in the temporary selection starting position memory area 13d. Consequently, thumbnails for image files having a selection status flag set to "selected" are displayed on the LCD 16 in the selected state, as shown in FIG. 6D.

In the first embodiment described above, the user can select (or deselect) image files for reference numbers ranging sequentially from the reference number of the image file corresponding to the first touched thumbnail to the reference number of the image file corresponding to the last touched thumbnail by performing a simple operation (single operation) of tracing the user's finger over a plurality of thumbnails displayed on the LCD 16. If the user wishes to select (or deselect) three or more image files, the user need only touch two thumbnails displayed on the LCD 16 since three or more image files corresponding to all reference numbers between reference numbers of the image files corresponding to the two touched thumbnails (including the reference numbers for these two image files) are selected in order of reference number. Hence, the user need not touch all thumbnails corresponding to the three or more image files being selected (or deselected).

Conventionally, thumbnails displayed within rectangular regions on the LCD 16 were identified when a corresponding rectangular region on the touch panel 17 was indicated, and the image file corresponding to the identified thumbnail was selected (or deselected).

Accordingly, when selecting (or deselecting) a plurality of thumbnails, the user had to indicate at least two regions on the touch panel 17 when the thumbnails that the user wished to select (or deselect) started or ended in the middle of a row. However, in the first embodiment described above, the user can select (or deselect) image files having reference numbers ranging sequentially from the reference number for the image file corresponding to the first touched thumbnail to the reference number for the image file corresponding to the last touched thumbnail, enabling the user to select (or deselect) a plurality of image files through a simple operation. The user can also adjust the selected (or deselected) range of images any number of times while the user's finger remains touching the touch panel 17, making this technique more user-friendly.

The MFP 1 of the first embodiment described above is particularly convenient when selecting (or deselecting) thumbnails displayed successively along the direction of rows. For example, when the user wishes to select image files for thumbnails displayed at display position numbers "A1-C1", the user need only touch the thumbnail at display position number "A1" and slide the finger downward over the touch panel 17 to the thumbnail at display position number "C1", a simple operation in which the user slides the finger a short distance to select all image files between display position numbers "A1" and "C1".

Next, a method of deselecting image files whose selection status flags are set to "selected" will be described with reference to FIGS. 8A-8D. In this method, the user traces a path over thumbnails with the user's finger in contact with the touch panel 17.

Figure 8A:
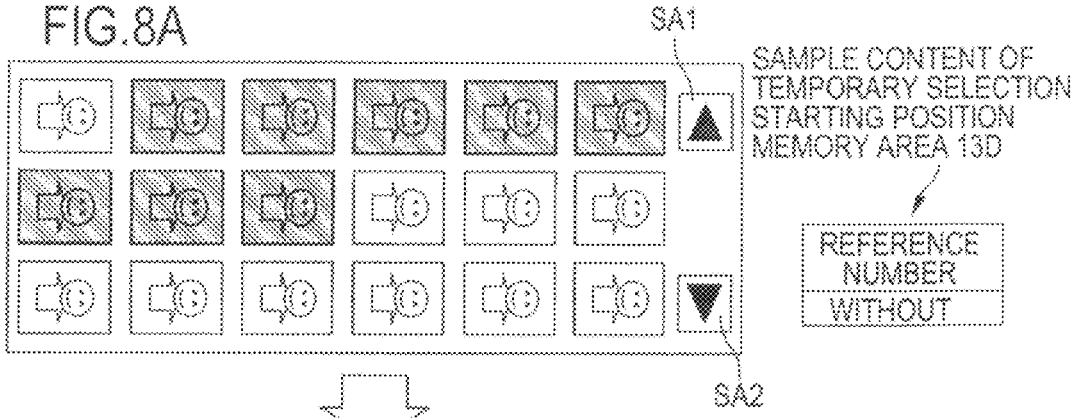
FIGS. 8A-8D are explanatory diagrams illustrating a method of changing the selection status flag for image files from "selected" to "unselected" by touching the touch panel and tracing a path over thumbnails displayed on the LCD.

FIGS. 8A-8D are explanatory diagrams conceptually illustrating the method of changing the "selected" setting of the selection status flag to "unselected" for image files corresponding to thumbnails displayed on the LCD 16 by sliding a finger over these thumbnails on the touch panel 17. As shown in FIG. 8A, the selection status flags for image files corresponding to thumbnails displayed at display position numbers "A2-B3" are set to "selected," resulting in these thumbnails being displayed in the selected state on the LCD 16.

Figure 8B:
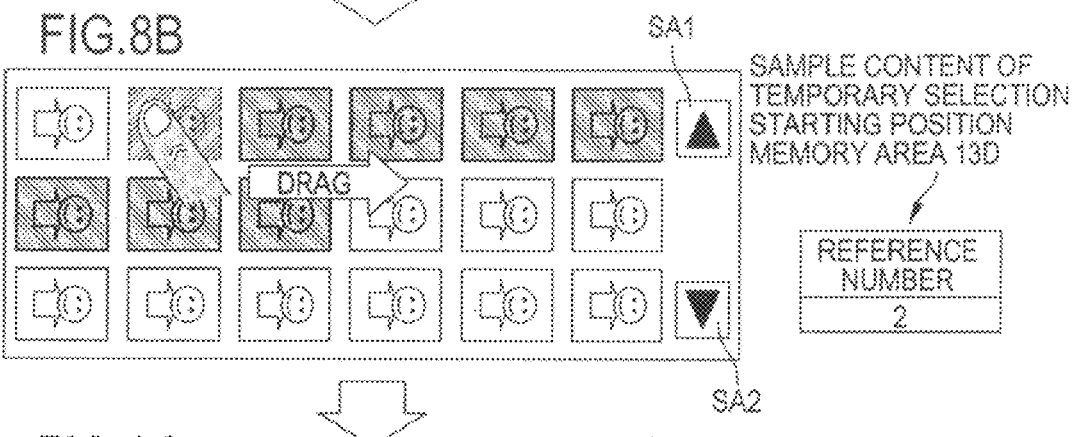

If the user touches the touch panel 17 at a position corresponding to the thumbnail at display position number "A2" at this time, as shown in FIG. 8B, reference number "2" in the line of the thumbnail list having display position number "A2" is stored in both the temporary selection starting position memory area 13d and the temporary selection list memory area 13c. Consequently, the thumbnail for the image file corresponding to reference number "2" stored in the temporary selection list memory area 13c is displayed in a temporarily selected state on the LCD 16, as shown in FIG. 8B.

Figure 8C:
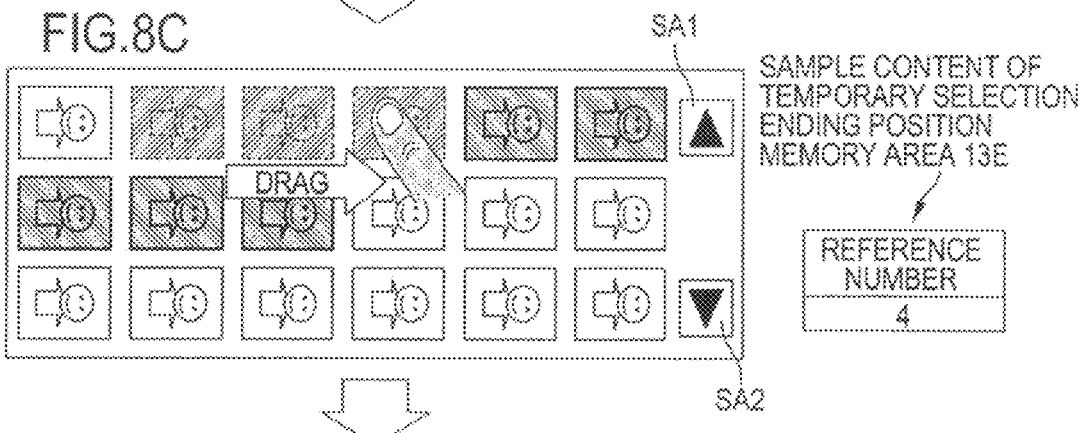

Next, while a keeping the finger in contact with the touch panel 17, the user slides the finger to the thumbnail at display position number "A4", as shown in FIG. 8C. At this time, reference number "4" in the line of the thumbnail list having display position number "A4" is stored in the temporary selection ending position memory area 13e. Next, all reference numbers "2-4" ranging in succession from reference number "2" stored in the temporary selection starting position memory area 13d to reference number "4" stored in the temporary selection ending position memory area 13e are stored in the temporary selection list memory area 13c. Consequently, thumbnails for image files corresponding to reference numbers "2-4" stored in the temporary selection list memory area 13c are displayed on the LCD 16 in the temporarily selected state, as shown in FIG. 8C.

Figure 8D:
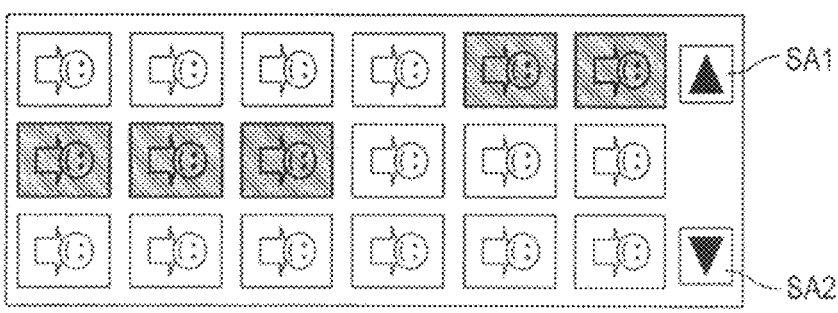

If the user lifts the finger from the touch panel 17 at this time, all selection status flags for reference numbers "2-4" stored in the temporary selection list memory area 13c are set to "unselected" in the thumbnail list since the selection status flag for reference number "2" stored in the temporary selection starting position memory area 13d is "selected" in the thumbnail list. Consequently, the thumbnails for these image files having selection status flags now set to "unselected" are displayed on the LCD 16 in the unselected state, as shown in FIG. 8D.

Next, a method of selecting image files when the number of image files stored in the memory card 22a exceeds the number of thumbnails that can be displayed on the LCD 16 (eighteen thumbnails in this embodiment) will be described with reference to FIGS. 9A-12C. In this method, the user operates the scrolling arrows SA1 and SA2 to scroll thumbnails displayed on the LCD 16.

FIGS. 9A-10C are explanatory diagrams illustrating the method of selecting image files by operating the scrolling arrow SA2 to scroll thumbnails displayed on the LCD 16.

In the following example, it will be assumed that 48 image files are recorded in the thumbnail list stored in the thumbnail list memory area 13b, each image file being assigned a unique reference number from "1" to "48" and the selection status flags for all image files being set to "unselected." Accordingly, all thumbnails displayed on the LCD 16 are in an unselected state.

In the thumbnail list, the line having reference number "1" is the starting position for display position numbers and, hence, the display position number in this line is set to "A1", while the display position number in the next row having reference number "2" is set to "A2". In this way, the display position numbers are assigned sequentially to lines in the thumbnail list up to display position number "C6" in increasing order of the reference numbers.

Figure 9A:
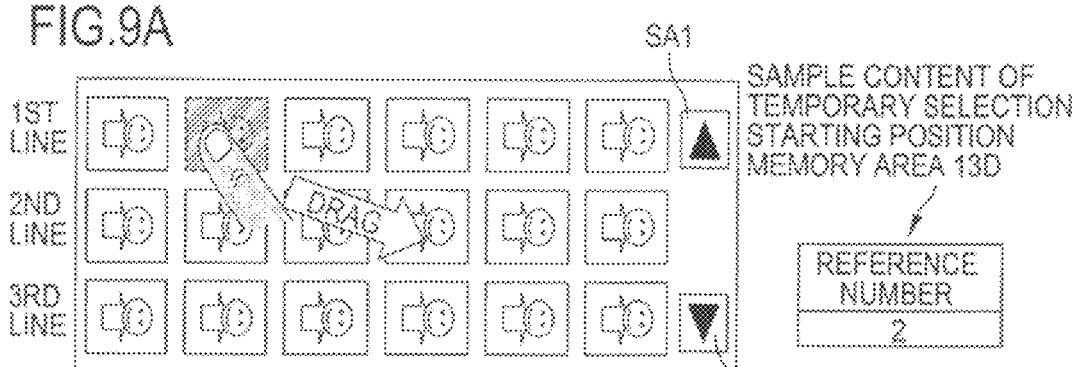
FIGS. 9A-9D are explanatory diagrams illustrating a method of selecting images files by operating a scrolling arrow SA2 to scroll thumbnails displayed on the LCD.

If the user touches the thumbnail at display position number "A2" at this time, as shown in FIG. 9A, reference number "2" in the line of the thumbnail list having display position number "A2" is stored in both the temporary selection starting position memory area 13*d* and the temporary selection list memory area 13*c*. Consequently, the thumbnail for the image file corresponding to reference number "2" stored in the temporary selection list memory area 13*c* is displayed on the LCD 16 in the temporarily selected state, as shown in FIG. 9A.

Figure 9B:
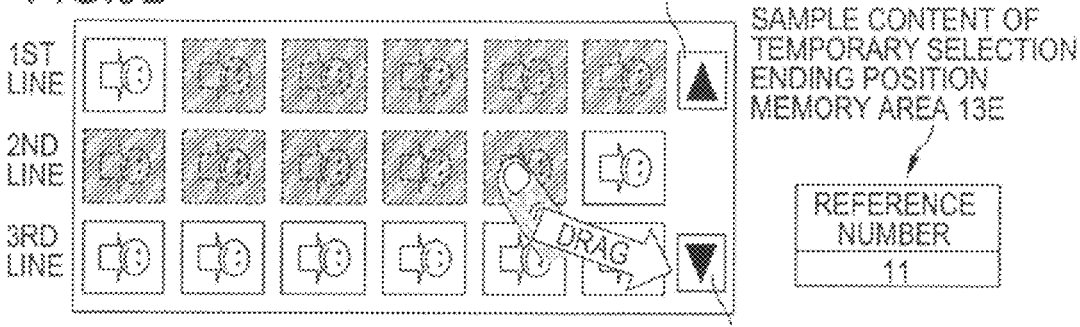

In this example, the user next slides the user's finger to the thumbnail at display position number "B5" while keeping the finger in contact with the touch panel 17, as shown in FIG. 9B. At this time, reference number "11" in the line of the thumbnail list having display position number "B5" is stored in the temporary selection ending position memory area 13*e*, and all reference numbers "2-11" ranging in succession from reference number "2" stored in the temporary selection starting position memory area 13*d* to reference number "11" stored in the temporary selection ending position memory area 13*e* are stored in the temporary selection list memory area 13*c*. Consequently, thumbnails for image files corresponding to reference numbers "2-11" stored in the temporary selection list memory area 13*c* are displayed on the LCD 16 in the temporarily selected state, as shown in FIG. 9B.

Figure 9C:
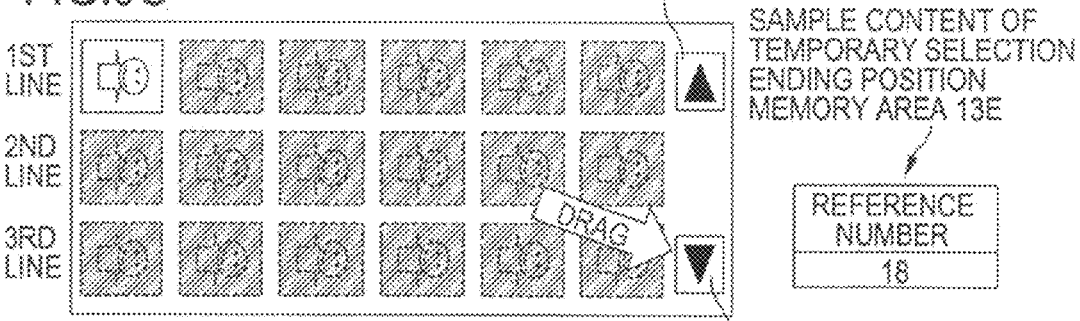

Next, the user slides the finger through the thumbnail at display position number "C6" to the scrolling arrow SA2 at display position number "C7" while the finger remains in contact with the touch panel 17, as illustrated in FIGS. 9B and 9C. Since the user's finger first contacted the thumbnail at display position number "C6", reference number "18" in the thumbnail list having display position number "C6" is stored in the temporary selection ending position memory area 13*e* and all reference numbers "2-18" ranging in succession from reference number "2" stored in the temporary selection starting position memory area 13*d* to reference number "18" stored in the temporary selection ending position memory area 13*e* are stored in the temporary selection list memory area 13*c*. Consequently, thumbnails for image files corresponding to reference numbers "2-18" stored in the temporary selection list memory area 13*c* are displayed on the LCD 16 in a temporarily selected state, as shown in FIG. 9C.

Next, when the position of the user's finger has moved to the scrolling arrow SA2 at display position number "C7", the thumbnails are scrolled in the LCD 16. Specifically, all thumbnails displayed in the second row of the LCD 16 are moved to the first row, all thumbnails in the third row are moved to the second row, and new thumbnails are displayed in the third row.

More specifically, when the user's finger touches the scrolling arrow SA2 at display position number "C7" on the LCD 16, first display position numbers "A1-C6" are modified in the thumbnail list. That is, display position number "A1" is moved to the line of the thumbnail list with reference number "7", display position number "A2" is moved to the line with reference number "8", and subsequent display position numbers are moved in the same way, with display position number "C6" being moved to the line having reference number "24". Hence, each display position number "A1-C6" stored in the thumbnail list is moved down six lines in the list.

Next, thumbnails for image files corresponding to the modified display position numbers "A1-C6" in the thumbnail list are displayed at display position numbers "A1-C6" on the LCD 16, and the reference number for the image file corresponding to the new thumbnail displayed at display position number "C6" on the LCD 16 is stored in the temporary selection ending position memory area 13*e*. Next, all reference numbers ranging in succession from the reference number stored in the temporary selection starting position memory area 13*d* to the reference number stored in the temporary selection ending position memory area 13*e* are stored in the temporary selection list memory area 13*c*. Consequently, thumbnails for image files corresponding to the reference numbers stored in the temporary selection list memory area 13*c* are displayed on the LCD 16 in the temporarily selected state. The above process is repeated at prescribed intervals (every 2 seconds, for example) while the user's finger remains in contact with the scrolling arrow SA2, thereby continuing to scroll the thumbnails displayed on the LCD 16.

Figure 9D:
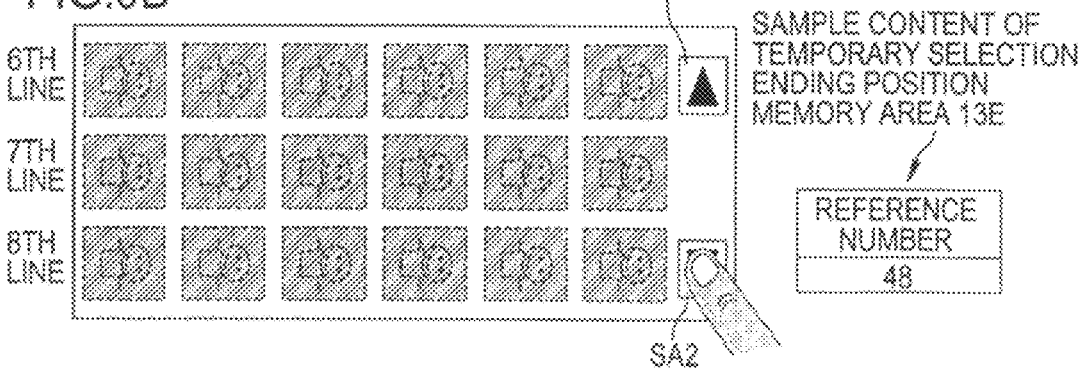

FIG. 9D shows the state of thumbnails displayed on the LCD 16 after the thumbnails were scrolled six times from the state shown in FIG. 9C. That is, display position number "A1" has been moved to the line in the thumbnail list having reference number "31", display position number "A2" has been moved to the line having reference number "32", and subsequent display position numbers have been moved in the same way, with display position number "C6" being moved to the line with reference number "48".

Therefore, reference number "48" is stored in the temporary selection ending position memory area 13*e*, and all reference numbers "2-48" ranging in succession from reference number "2" stored in the temporary selection starting position memory area 13*d* to reference number "48" stored in the temporary selection ending position memory area 13*e* have been stored in the temporary selection list memory area 13*c*. Consequently, thumbnails for image files corresponding to reference numbers "2-48" stored in the temporary selection list memory area 13*c* are displayed on the LCD 16 in the temporarily selected state, as shown in FIG. 9D.

If the user further slides the finger to the thumbnail at display position number "C4" while keeping the finger in contact with the touch panel 17, as shown in FIG. 10A, reference number "46" for the line in the thumbnail list having display position number "C6" is stored in the temporary selection ending position memory area 13*e*, and all reference numbers "2-46" ranging in succession from reference number "2" stored in the temporary selection starting position memory area 13*d* to reference number "46" stored in the temporary selection ending position memory area 13*e* are stored in the temporary selection list memory area 13*c*. Consequently, thumbnails for image files corresponding to reference numbers "2-46" stored in the temporary selection list memory area 13*c* are displayed on the LCD 16 in the temporarily selected state, as shown in FIG. 10A.

If the user lifts the finger from the touch panel 17 at this time, the selection status flags for all reference numbers "2-46" stored in the temporary selection list memory area 13*c* are set to "selected" in the thumbnail list since the selection status flag for the image file corresponding to image number "2" stored in the temporary selection starting position memory area 13*d* is set to "unselected." Consequently, thumbnails for image files having selection status flags set to "selected" are displayed on the LCD 16 in the selected state, as shown in FIG. 10B.

However, if the user lifts the finger from the touch panel 17 in FIG. 9D while still contacting the scrolling arrow SA2, then selection status flags for all reference numbers "2-48" stored in the temporary selection list memory area 13*c* are set to "selected" in the thumbnail list since the selection status flag for the image file corresponding to the reference number "2" stored in the temporary selection starting position memory area 13d is set to "unselected." Accordingly, thumbnails for image files having selection status flags set to "selected" are displayed on the LCD 16 in the selected state, as shown in FIG. 10C.

Next, a method of selecting image files will be described with reference to FIGS. 11A-12C. In this method, the user operates the scrolling arrow SA1 to scroll thumbnails displayed on the LCD 16.

FIGS. 11A-12C are explanatory diagrams illustrating the method of selecting image files by operating the scrolling arrow SA1 to scroll thumbnails displayed on the LCD 16.

In the following example, it will be assumed that 48 image files are recorded in the thumbnail list stored in the thumbnail list memory area 13b, each image file being assigned a unique reference number from "1" to "48" and the selection status flags for all image files being set to "unselected." Accordingly, all thumbnails displayed on the LCD 16 are in an unselected state.

In the thumbnail list, the line having reference number "25" is the starting position for display position numbers and, hence, the display position number in this line is set to "A1", while the display position number in the next row having reference number "26" is set to "A2". In this way, the display position numbers are assigned sequentially to lines in the thumbnail list up to display position number "C6" in increasing order of the reference numbers.

Figure 11A:
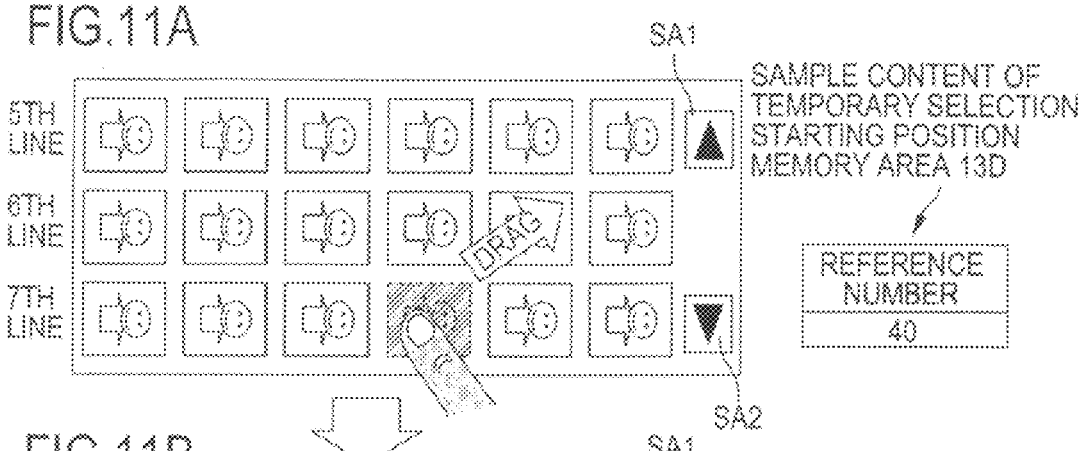
FIGS. 11A-11D are explanatory diagrams illustrating a method of selecting images files by operating a scrolling arrow SA1 to scroll thumbnails displayed on the LCD.

If the user touches the thumbnail at display position number "C4" at this time, as shown in FIG. 11A, reference number "40" in the line of the thumbnail list having display position number "C4" is stored in both the temporary selection starting position memory area 13d and the temporary selection list memory area 13c. Consequently, the thumbnail for the image file corresponding to reference number "40" stored in the temporary selection list memory area 13c is displayed on the LCD 16 in the temporarily selected state, as shown in FIG. 11A.

Figure 11B:
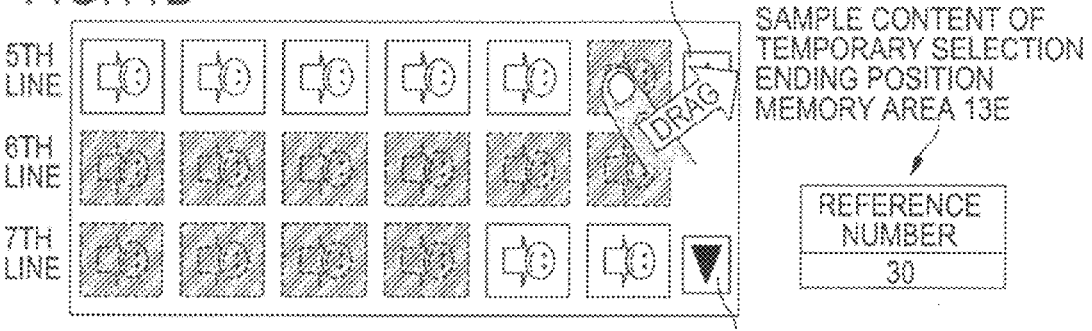

In this example, the user next slides the user's finger to the thumbnail at display position number "A6" while keeping the finger in contact with the touch panel 17, as shown in FIG. 11B. At this time, reference number "30" in the line of the thumbnail list having display position number "A6" is stored in the temporary selection ending position memory area 13e, and all reference numbers "30-40" ranging in succession from reference number "40" stored in the temporary selection starting position memory area 13d to reference number "30" stored in the temporary selection ending position memory area 13e are stored in the temporary selection list memory area 13c. Consequently, thumbnails for image files corresponding to reference numbers "30-40" stored in the temporary selection list memory area 13c are displayed on the LCD 16 in the temporarily selected state, as shown in FIG. 11B.

Figure 11C:
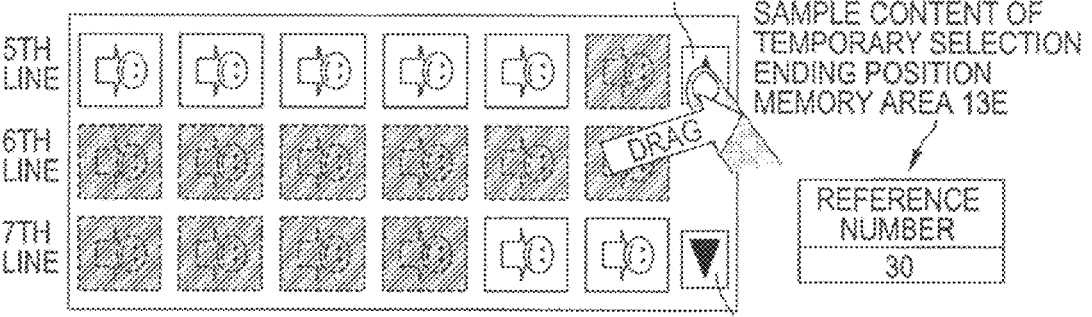

Next, the user slides the finger to the scrolling arrow SA1 at display position number "A7" while the finger remains in contact with the touch panel 17, as illustrated in FIG. 11C. When the position of the user's finger reaches the scrolling arrow SA1 at display position number "A7", the thumbnails are scrolled in the LCD 16. Specifically, all thumbnails displayed in the first row of the LCD 16 are moved to the second row, all thumbnails in the second row are moved to the third row, and new thumbnails are displayed in the first row.

More specifically, when the user's finger touches the scrolling arrow SA1 at display position number "A7" on the LCD 16, first display position numbers "A1-C6" are modified in the thumbnail list. That is, display position number "A1" is moved to the line of the thumbnail list with reference number "19", display position number "A2" is moved to the line with reference number "20", and subsequent display position numbers are moved in the same way, with display position number "C6" being moved to the line having reference number "36". Hence, each display position number "A1-C6" stored in the thumbnail list is moved up six lines in the list.

Next, thumbnails for image files corresponding to the modified display position numbers "A1-C6" in the thumbnail list are displayed at display position numbers "A1-C6" on the LCD 16, and the reference number for the image file corresponding to the new thumbnail displayed at display position number "A6" on the LCD 16 is stored in the temporary selection ending position memory area 13e. Next, all reference numbers ranging in succession from the reference number stored in the temporary selection starting position memory area 13d to the reference number stored in the temporary selection ending position memory area 13e are stored in the temporary selection list memory area 13c. Consequently, thumbnails for image files corresponding to the reference numbers stored in the temporary selection list memory area 13c are displayed on the LCD 16 in the temporarily selected state. The above process is repeated at prescribed intervals (every 2 seconds, for example) while the user's finger remains in contact with the scrolling arrow SA1, thereby continuing to scroll the thumbnails displayed on the LCD 16.

Figure 11D:
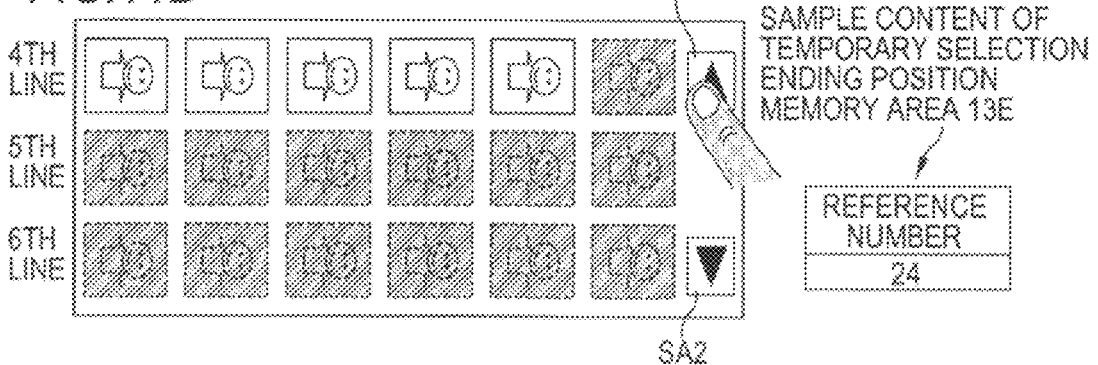

FIG. 11D shows the state of thumbnails displayed on the LCD 16 after the thumbnails were scrolled once from the state shown in FIG. 11C. That is, display position number "A1" has been moved to the line in the thumbnail list having reference number "19", display position number "A2" has been moved to the line having reference number "20", and subsequent display position numbers have been moved in the same way, with display position number "C6" being moved to the line with reference number "36".

Therefore, reference number "24" is stored in the temporary selection ending position memory area 13e, and all reference numbers "24-40" ranging in succession from reference number "40" stored in the temporary selection starting position memory area 13d to reference number "24" stored in the temporary selection ending position memory area 13e have been stored in the temporary selection list memory area 13c. Consequently, thumbnails for image files corresponding to reference numbers "24-40" stored in the temporary selection list memory area 13c are displayed on the LCD 16 in the temporarily selected state, as shown in FIG. 11D.

If the user further slides the finger to the thumbnail at display position number "A5" while keeping the finger in contact with the touch panel 17, as shown in FIG. 12A, reference number "23" for the line in the thumbnail list having display position number "A5" is stored in the temporary selection ending position memory area 13e, and all reference numbers "23-40" ranging in succession from reference number "40" stored in the temporary selection starting position memory area 13d to reference number "23" stored in the temporary selection ending position memory area 13e are stored in the temporary selection list memory area 13c. Consequently, thumbnails for image files corresponding to reference numbers "23-40" stored in the temporary selection list memory area 13c are displayed on the LCD 16 in the temporarily selected state, as shown in FIG. 12A.

If the user lifts the finger from the touch panel 17 at this time, the selection status flags for all reference numbers "23-40" stored in the temporary selection list memory area 13c are set to "selected" in the thumbnail list since the selection status flag for the image file corresponding to image number "40" stored in the temporary selection starting position memory area 13d is set to "unselected." Consequently, thumbnails for image files having selection status flags set to "selected" are displayed on the LCD 16 in the selected state, as shown in FIG. 12B.

However, if the user lifts the finger from the touch panel 17 while still contacting the scrolling arrow SA1, then selection status flags for all reference numbers "24-40" stored in the temporary selection list memory area 13c are set to "selected" in the thumbnail list since the selection status flag for the image file corresponding to the reference number "40" stored in the temporary selection starting position memory area 13d is set to "unselected." Accordingly, thumbnails for image files having selection status flags set to "selected" are displayed on the LCD 16 in the selected state, as shown in FIG. 12C.

In the first embodiment described above, when the user moves a finger over thumbnails to either the scrolling arrow SA1 or SA2 while keeping the finger in contact with the touch panel 17, the MFP 1 scrolls the thumbnails displayed on the LCD 16 so that new thumbnails can be displayed. Without touching the newly displayed thumbnails, the newly displayed thumbnails will be set to the same selected state that would be set if the user touched the thumbnail displayed immediately to the left of the touched scrolling arrow SA1 or SA2, making the operation simpler and more user-friendly.

Further, since the scrolling arrows SA1 and SA2 are displayed slightly above the bottom edge of the thumbnails displayed in the first row (uppermost row) on the LCD 16 or slightly lower than the upper edge of thumbnails in the third row (lowest row), the user is less likely to perform an unintentional scrolling operation by accidentally touching one of the scrolling arrows SA1 and SA2 when touching thumbnails in the second row (middle row).

Further, since the scrolling arrows SA1 and SA2 are displayed on the right side of the thumbnails in the sixth column (rightmost column) on the LCD 16, the user is less likely to perform an unintentional scrolling operation by accidentally touching one of the scrolling arrows SA1 and SA2 when touching thumbnails in the first through fifth columns. Further, by displaying both of the scrolling arrows SA1 and SA2 on the same end of the LCD 16, the user can scroll images intuitively.

While the scrolling arrows SA1 and SA2 are provided on the right side of the screen in this embodiment described above, the scrolling arrows SA1 and SA2 may be provided on the left side instead. In this case, the scrolling arrows SA1 and SA2 are preferably displayed to the left of thumbnails in the first column (leftmost column) displayed on the LCD 16. When the user touches the scrolling arrow SA1 in this case, the CPU 11 stores reference numbers for the line in the thumbnail list having display position number "A1" in the temporary selection ending position memory area 13e. When the user touches the scrolling arrow SA2, the CPU 11 stores the reference number in the line of the thumbnail list having display position number "C1" in the temporary selection ending position memory area 13e.

Further, while the thumbnails are scrolled upward or downward in this embodiment described above, the thumbnails may be scrolled leftward or rightward instead. In this case, the scrolling arrows SA1 and SA2 are displayed above thumbnails in the first row (uppermost row) or below thumbnails in the third row (lowermost row). By displaying both the scrolling arrows SA1 and SA2 on the same edge of the LCD 16, the user can scroll thumbnails more intuitively.

Next, a method of operating the touch panel 17 when thumbnails are displayed in a single row on the LCD 16 will be described with reference to FIGS. 13A-13H.

FIGS. 13A-13H illustrate the method of operating the touch panel 17 for thumbnails displayed in one row on the LCD 16.

In the following example, it will be assumed that ten image files are recorded in the thumbnail list stored in the thumbnail list memory area 13b, with unique reference numbers "1-10" assigned to the image files and the selection status flags for all image files set to "unselected." Hence, thumbnails displayed on the LCD 16 are in the unselected state.

Figure 13A:
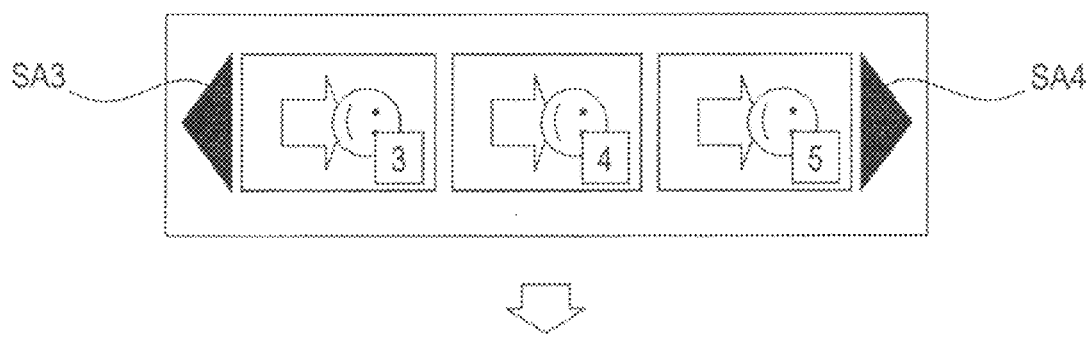
FIGS. 13A-13H are explanatory diagrams illustrating a method of operating the touch panel when thumbnails are displayed in a single row on the LCD.

As shown in FIG. 13A, three thumbnails are displayed on the LCD 16, with the corresponding reference number displayed in the lower right corner of each thumbnail. In this description, the thumbnail displayed in the left of the LCD 16 has display position number "A1", the thumbnail displayed in the center has display position number "A2", and the thumbnail displayed on the right has display position number "A3". Further, a scrolling arrow SA3 displayed to the left of display position number "A1" has display position number "A0", while a scrolling arrow SA4 displayed to the right of display position number "A3" has display position number "A4".

In FIG. 13A, the thumbnail for the image file corresponding to reference number "3" in the thumbnail list is displayed at the display position on the LCD 16 having display position number "A1", the thumbnail for the image file corresponding to reference number "4" is displayed at the display position having display position number "A2", and the thumbnail for the image file corresponding to reference number "5" is displayed at the display position having display position number "A3".

Figure 13B:
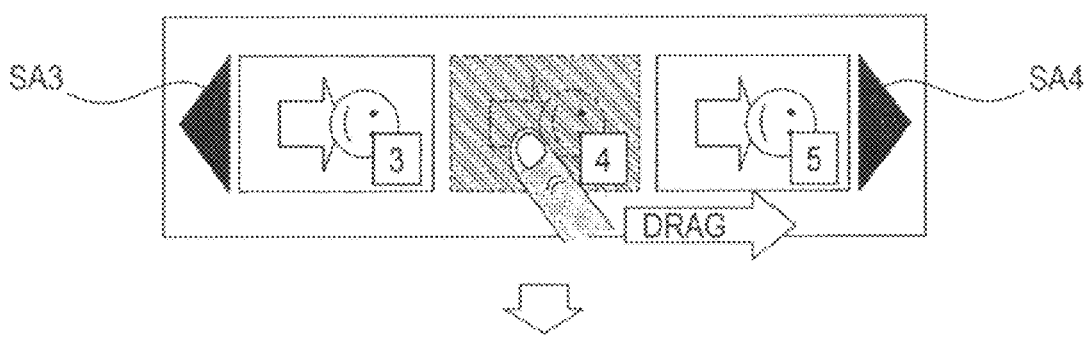

If the user touches the thumbnail at display position number "A2" at this time, as shown in FIG. 13B, reference number "4" in the line having display position number "A2" in the thumbnail list is stored in both the temporary selection starting position memory area 13d and the temporary selection list memory area 13c. Consequently, the thumbnail for the image file corresponding to reference number "4" stored in the temporary selection list memory area 13c is displayed on the LCD 16 in a temporarily selected state, as shown in FIG. 13B.

Figure 13C:
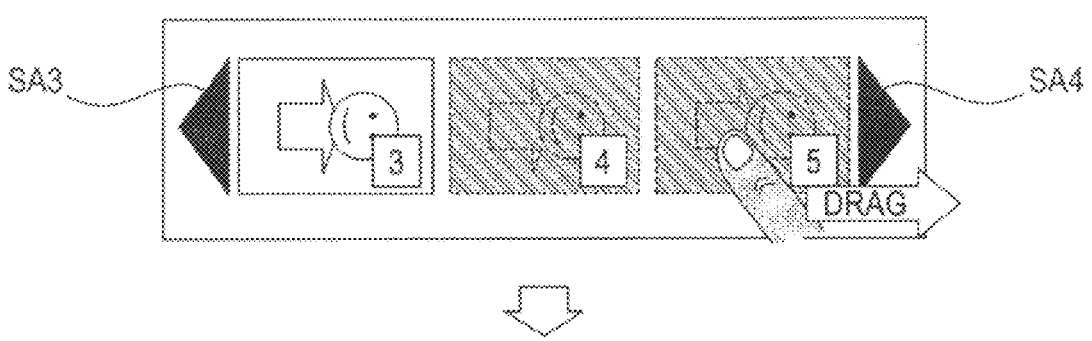

If the user subsequently slides the finger to the thumbnail at display position number "A3" while keeping the finger in contact with the touch panel 17, as shown in FIG. 13C, reference number "5" having display position number "A3" in the thumbnail list is stored in the temporary selection ending position memory area 13e, and reference numbers "4-5" are stored in the temporary selection list memory area 13c. Therefore, thumbnails for image files corresponding to reference numbers "4-5" are displayed on the LCD 16 in the temporarily selected state, as shown in FIG. 13C.

Figure 13D:
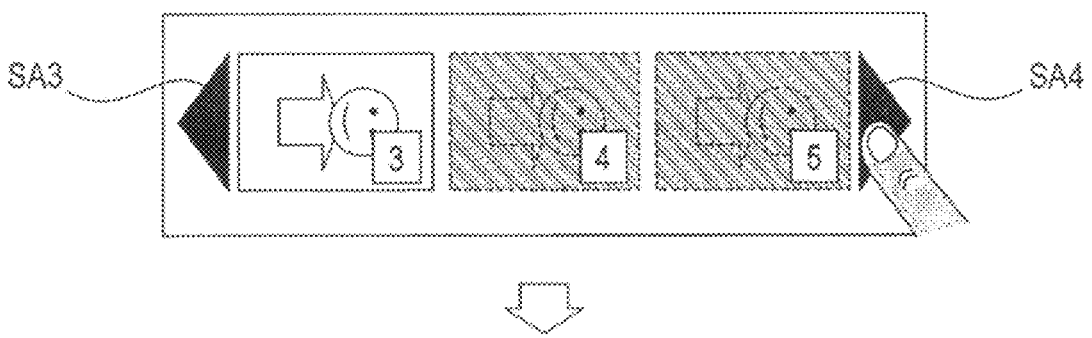
Figure 13E:
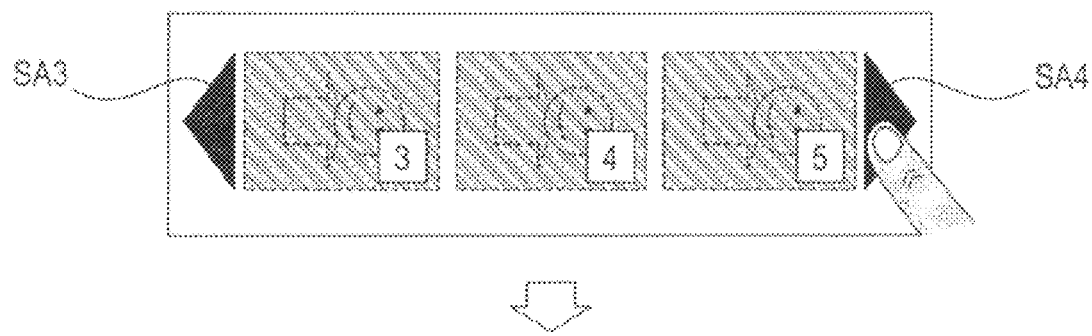

If the user further slides the finger to the scrolling arrow SA4 at display position number "A4" while keeping the finger in contact with the touch panel 17, as shown in FIG. 13D, the thumbnails displayed on the LCD 16 are scrolled. Specifically, as shown in FIG. 13E, the thumbnail corresponding to reference number "4" is displayed at the display position having display position number "A1", the thumbnail corresponding to reference number "5" is displayed at the display position having display position number "A2", and the thumbnail corresponding to reference number "6" is displayed at the display position having display position number "A3". Reference number "6" for the image file corresponding to the thumbnail displayed at display position number "A3" is stored in the temporary selection ending position memory area 13e and reference numbers "4-6" are stored in the temporary selection list memory area 13c. Accordingly, thumbnails for image files corresponding to reference numbers "4-6" are displayed on the LCD 16 in the temporarily selected state, as shown in FIG. 13E.

The thumbnails displayed on the LCD 16 continue to scroll at prescribed intervals while the user continues touching the scrolling arrow SA4 at display position number "A4". For example, after a prescribed time, the thumbnail corresponding to reference number "7" is displayed at the display position having display position number "A1", the thumbnail corresponding to reference number "8" is displayed at the display position having display position number "A2", and the thumbnail corresponding to reference number "9" is displayed at the display position having display position number "A3". At this time, reference number "9" for the image file corresponding to the thumbnail displayed at display position number "A3" is stored in the temporary selection ending position memory area 13*e*, and reference numbers "4-9" are stored in the temporary selection list memory area 13*c*. Accordingly, thumbnails for image files corresponding to reference numbers "4-9" are displayed on the LCD 16 in the temporarily selected state.

Figure 13F:
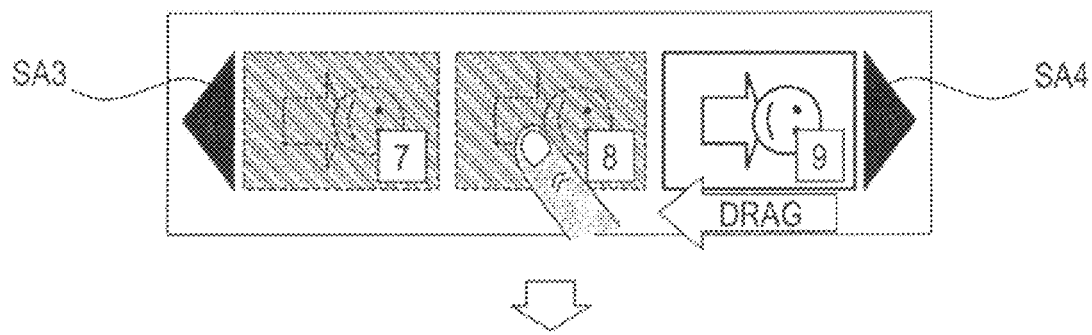

At this time, if the user slides the finger leftward to the thumbnail at display position number "A2" while continuing to touch the touch panel 17, as shown in FIG. 13F, reference number "8" for the image file corresponding to the thumbnail displayed at display position number "A2" is stored in the temporary selection ending position memory area 13*e* and reference numbers "4-8" are stored in the temporary selection list memory area 13*c*. Accordingly, thumbnails for image files corresponding to reference numbers "4-8" are displayed on the LCD 16 in the temporarily selected state.

Figure 13G:
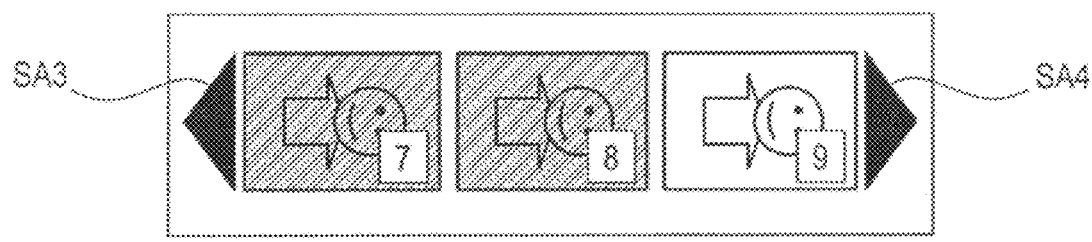

If the user lifts the finger from the touch panel 17 at this time, selection status flags for all reference numbers "4-8" stored in the temporary selection list memory area 13*c* are set to "selected" in the thumbnail list since the selection status flag for the image file corresponding to reference number "4" stored in the temporary selection starting position memory area 13*d* is set to "unselected" in the thumbnail list. Consequently, thumbnails for image files having a selection status flag set to "selected" are displayed in the selected state on the LCD 16, as shown in FIG. 13G.

Figure 13H:
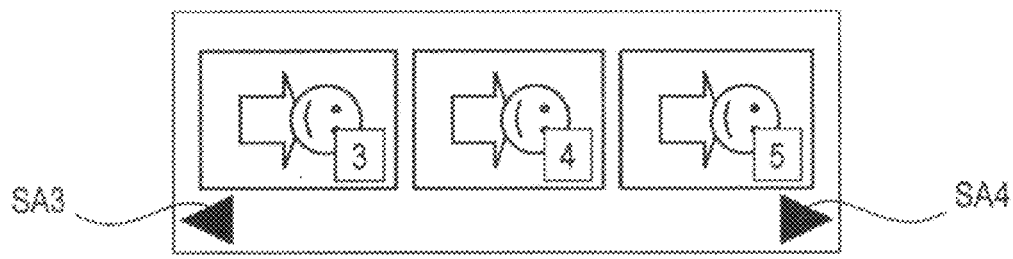

Since the scrolling arrow SA3 is displayed leftward of the right edge of the thumbnail displayed in the leftmost display position and the scrolling arrow SA4 is displayed rightward of the left edge of the thumbnail displayed in the rightmost display position when thumbnails are displayed in a single row on the LCD 16, the user is less likely to perform an unintended scrolling operation by mistakenly touching the scrolling arrow SA3 or SA4 when touching one of the middle thumbnails (thumbnails other than those on the left and right ends of the row). Aligning the thumbnails and the scrolling arrows SA3 and SA4 laterally in the display in this embodiment described above reduces the required vertical dimension of the display region. The horizontal dimension of the display region can also be reduced by positioning the scrolling arrows SA3 and SA4 as shown in FIG. 13H.

While the thumbnails are displayed in the direction of rows in this embodiment described above, the thumbnails may be displayed in the direction of columns instead. In this case, the scrolling arrows SA3 and SA4 are displayed in the top or bottom of the screen, and preferably above the lower edge of the thumbnail displayed in the topmost position of the LCD 16 or below the upper edge of the thumbnail displayed in the bottommost position. Naturally, the horizontal dimension of the display region can be conserved when aligning the thumbnails and the scrolling arrows SA3 and SA4 in the vertical direction of the screen, while the vertical dimension of the display region can also be reduced by employing the display format shown in FIG. 13H, except arranged vertically instead of horizontally.

With the first embodiment described above, the user can perform a simple operation of sliding a finger over thumbnails displayed on the LCD 16 and subsequently lifting the finger to specify all image files for reference numbers ranging continuously from the reference number of the image file corresponding to the first touched thumbnail to the reference number of the image file corresponding to the last touched thumbnail, selecting or deselecting all image files within the specified range.

Specifically, selection status flags for all image files within the range specified by sliding a finger over the thumbnails are set to "selected" if the selection status flag for the image file corresponding to the first touched thumbnail was set to "unselected," and to "unselected" if the selection status flag for the image file corresponding to the first touched thumbnail was "selected." Therefore, this operation is simple and easy to understand for the user since selection status flags of all image files within the range specified by sliding the finger are set based on the selection status flag of the image file corresponding to the first touched thumbnail.

Next, a second embodiment of the present invention will be described. In the second embodiment, the user performs a simple operation to individually specify two thumbnails by touching two thumbnails displayed on the LCD 16. Through this simple operation, the user can specify all image files having reference numbers ranging sequentially from the reference number for the image file corresponding to the first touched thumbnail to the reference number for the image files corresponding to the next touched thumbnail in order to select or deselect all image files within this range.

As a result, the selection status flags for all image files within the specified range are set to "selected" when the selection status flag for the image file corresponding to the first touched thumbnail is set to "unselected" and are set to "unselected" when the selection status flag for the image files corresponding to the first touched thumbnail is set to "selected." In other words, selection status flags for image files within the specified range are determined based on the setting of the selection status flag for the image file corresponding to the first touched thumbnail, thereby making the operation simple and user-friendly.

Next, the printing process executed by the CPU 11 of the MFP 1 according to the second embodiment will be described with reference to FIG. 14. FIG. 14 is a flowchart illustrating steps in this printing process and is executed when the user presses the Print Image File button 15*a* while a memory card 22*a* is inserted into one of the memory card slots 22.

In this printing process, the user can select desired image files from those stored in the memory card 22*a* through simple operations and can direct the printer 21 to print images on printing paper based on the selected image files.

In S41 of the printing process, the CPU 11 initializes the thumbnail list memory area 13*b*. In S42 the CPU 11 searches the memory card 22*a* for all image files, creates a thumbnail list based on the image files found in this search, and stores the thumbnail list in the thumbnail list memory area 13*b*. When the thumbnail list is created (i.e., when in its initial state), the selection status flags for all image files are set to "unselected." Further, "A1" is set as the display position number in the line having reference number "1" in the thumbnail list, "A2" is set as the display position number in the line having reference number "2", and subsequent display position numbers are set sequentially in increasing order of the reference numbers up to display position number "C6".

In S43 the CPU 11 displays the message "Select an image (press and hold to enter the continuous selection mode)" in the bottom of the display on the LCD 16, as shown in FIG.

16A. In S44 the CPU 11 displays thumbnails on the LCD 16 for image files corresponding to the display position numbers "A1-C6" in the thumbnail list stored in the thumbnail list memory area 13b and sets each thumbnail to the selected state or the unselected state based on the selection status flag for the corresponding image file.

In S45 the CPU 11 determines whether the position of the user's finger touching the touch panel 17 is a display position on the LCD 16 for displaying a thumbnail. If the position of the user's finger on the touch panel 17 is a display position for a thumbnail (S45: YES), in S46 the CPU 11 identifies the display position number of the thumbnail displayed at the display position on the LCD 16 matching the position of the user's finger on the touch panel 17.

However, if the position of the user's finger does not correspond to the display position for a thumbnail (S45: NO), the CPU 11 skips S45-S51 and advances to S52.

In S47 the CPU 11 determines whether the user's finger has touched the thumbnail at the display position number identified in S46 for at least a prescribed interval (1 second, for example). If the user's finger has not continually touched this thumbnail for a period exceeding the prescribed interval (S47: NO), in S48 the CPU 11 determines whether the selection status flag of the image file corresponding to the display position number identified in S46 is "unselected."

If the selection status flag for the image file corresponding to the identified display position number is "unselected" (S48: YES), in S49 the CPU 11 changes the selection status flag for this image file to "selected."However, if the selection status flag is not "unselected" (S48: NO), then in S50 the CPU 11 changes the selection status flag for this image file to "unselected." Subsequently, the CPU 11 returns to S44 and repeats the process in S44-S50 described above.

On the other hand, if the CPU 11 determines in S47 that the user's finger has touched the thumbnail at the display position number identified in S46 for a period exceeding the prescribed interval (S47: YES), then the CPU 11 executes a continuous selection process in S51.

Figure 15:
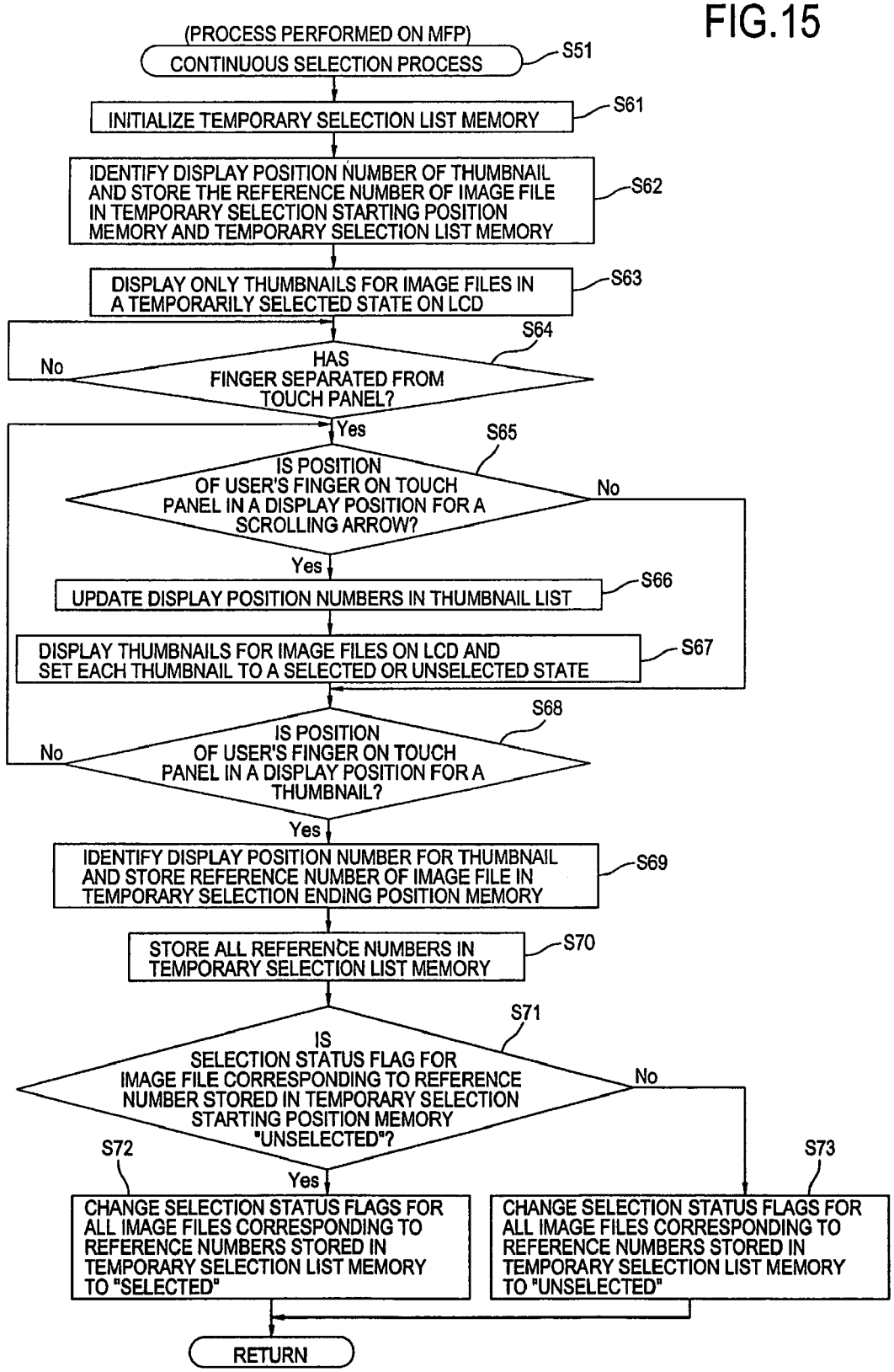
FIG. 15 is a flowchart illustrating steps in a continuous selection process executed on the multifunction peripheral.

Here, the continuous selection process of S51 will be described with reference to FIG. 15. FIG. 15 is a flowchart illustrating steps in the continuous selection process. This process serves to determine a sequential range of reference numbers from the reference number corresponding to the thumbnail touched by the user for the prescribed interval to the reference number corresponding to a thumbnail directly touched by the user after first removing the finger from the touch panel 17, and to change the selection status flags for all image files corresponding to the reference numbers in the determined range to "selected" or "unselected."

In S61 at the beginning of the continuous selection process, the CPU 11 initializes the temporary selection list memory area 13c. In S62 the CPU 11 identifies the display position number of the thumbnail displayed at the display position on the LCD 16 identical to the position of the user's finger on the touch panel 17 and stores the reference number of the image file corresponding to the identified display position number in both the temporary selection starting position memory area 13d and the temporary selection list memory area 13c. In S63 the CPU 11 sets thumbnails of image files corresponding to the reference numbers stored in the temporary selection list memory area 13c to the temporarily selected state on the LCD 16.

In S64 the CPU 11 waits as long as the user's finger has not separated from the touch panel 17 (S64: NO). When the user's finger has separated from the touch panel 17 (S64: YES), in S65 the CPU 11 determines whether the position of the user's finger on the touch panel 17 after the finger separated from the touch panel 17 and subsequently touched the touch panel 17 corresponds to a display position for one of the scrolling arrows SA1 and SA2. If the position of the user's finger does not correspond to a display position for one of the scrolling arrows SA1 and SA2 (S65: NO), then the CPU 11 skips S66-S67 and advances to S68.

However, if the position of the user's finger corresponds to a display position for one of the scrolling arrows SA1 and SA2 (S65: YES), in S66 the CPU 11 updates the display position numbers in the thumbnail list based on the display position number for the scrolling arrow SA1 or SA2 displayed at a position on the LCD 16 corresponding to the finger touching the touch panel 17. In S67 the CPU 11 displays thumbnails of image files corresponding to the display position numbers in the thumbnail list on the LCD 16 and sets each thumbnail to a selected state or an unselected state based on the selection status flag of the corresponding image file.

In S68 the CPU 11 determines whether the position of the user's finger on the touch panel 17 corresponds to a display position for a thumbnail. If the position of the user's finger does not correspond to a display position for a thumbnail (S68: NO), then the CPU 11 returns to S65 and repeats the process in S65-S68 described above. However, if the position of the user's finger on the touch panel 17 corresponds to a display position for a thumbnail (S68: YES), then in S69 the CPU 11 identifies the display position number of the thumbnail displayed at a display position on the LCD 16 matching the position of the user's finger on the touch panel 17 and stores the reference number of the image file corresponding to the identified display position number in the temporary selection ending position memory area 13e.

In S70 the CPU 11 stores in the temporary selection list memory area 13c all reference numbers in a continuous range from the reference number stored in the temporary selection starting position memory area 13d to the reference number stored in the temporary selection ending position memory area 13e. In S71 the CPU 11 determines whether the selection status flag of the image file corresponding to the reference number stored in the temporary selection starting position memory area 13d is set to "unselected."

If the selection status flag for this image file is "unselected" (S71: YES), then in S72 the CPU 11 changes selection status flags for all image files corresponding to reference numbers stored in the temporary selection list memory area 13c to "selected" in the thumbnail list stored in the thumbnail list memory area 13b. However, if the selection status flag for the image file corresponding to the reference number stored in the temporary selection starting position memory area 13d is set to "selected" (S71: NO), then in S73 the CPU 11 changes the selection status flags for all image files corresponding to reference numbers stored in the temporary selection list memory area 13c to "unselected" in the thumbnail list stored in the thumbnail list memory area 13b. Subsequently, the CPU 11 ends the continuous selection process of S51.

Through the continuous selection process of S51 described with reference to FIG. 15, the MFP 1 can determine a sequential range of reference numbers from the reference number corresponding to the thumbnail touched by the user for the prescribed interval to the reference number corresponding to a thumbnail directly touched by the user after first removing the finger from the touch panel 17, and can change the selection status flags for all image files corresponding to the reference numbers in the determined range to "selected" or "unselected." After completing the continuous selection process of S51, the CPU 11 returns to S44 in FIG. 14 and repeats the process of S44-S51 in FIG. 14.

In S52 of FIG. 14 the CPU 11 determines whether the position of the user's finger on the touch panel 17 corresponds to a display position for either the scrolling arrow SA1 or SA2 displayed on the LCD 16. If the position of the user's finger does correspond to a display position for the scrolling arrow SA1 or SA2 (S52: YES), then in S53 the CPU 11 updates the display position numbers in the thumbnail list based on the display position number of the scrolling arrow SA1 or SA2 displayed at the position of the user's finger. Subsequently, the CPU 11 returns to S44 and repeats the process in S44-S53 described above.

However, if the user's finger is not at a display position of the scrolling arrow SA1 or SA2 displayed on the LCD 16 (S52: NO), then the CPU 11 skips S53 and advances to S54.

In S54 the CPU 11 determines whether the Cancel button 15b has been pressed. If the Cancel button 15b has been pressed (S54: YES), the CPU 11 ends the printing process. However, if the Cancel button 15b has not been pressed (S54: NO), in S55 the CPU 11 determines whether the Print button 15c has been pressed.

If the CPU 11 determines that the Print button 15c has been pressed (S55: YES), in S56 the CPU 11 reads image files having a selection status flag set to "selected" in the thumbnail list stored in the thumbnail list memory area 13b from the memory card 22a, stores these image files in the image memory area 13a, controls the printer 21 to print an image of each file on printing paper, and subsequently ends the printing process. However, if the Print button 15c has not been pressed (S55: NO), the CPU 11 returns to S44 and repeats the process in S44-S55 described above.

Through the printing process of FIG. 14 described above, the user can specify two thumbnails displayed on the LCD 16 through a simple operation of touching the two thumbnails individually. In this way, the user can specify all image files having reference numbers ranging sequentially from the reference number of the image file corresponding to the first touched thumbnail to the reference number of the image file corresponding to the next touched thumbnail and can select or deselect all image files in the specified range.

Further, since the continuous selection process begins when the user touches and holds one thumbnail for a prescribed interval, the user is less likely to perform this operation by accident or another operation that unintentionally executes the continuous selection process.

Specifically, selection status flags for all image files within the specified range are set to "selected" if the selection status flag for the image file corresponding to the first touched thumbnail was set to "unselected," and to "unselected" if the selection status flag for the image file corresponding to the first touched thumbnail was "selected." Therefore, this operation is simple and easy to understand for the user since selection status flags of all image files within the specified range are set based on the selection status flag of the image file corresponding to the first touched thumbnail.

Next, a method of operating the touch panel 17 according to the second embodiment will be described with reference to FIGS. 16A-16E.

FIGS. 16A-16E are explanatory diagrams illustrating a method in which the user selects image files by touching two individual thumbnails displayed on the LCD 16 with a finger.

The following description assumes that the line having reference number "1" in the thumbnail list is the starting position for display position numbers and, hence, the display position number in this line is set to "A1". The display position number in the next line having reference number "2" is set to "A2". In this way, the display position numbers are assigned sequentially to lines in the thumbnail list up to display position number "C6" in increasing order of the reference numbers. Further, the following description assumes that all selection status flags in the thumbnail list have been set to "unselected." Therefore, all thumbnails displayed on the LCD 16 are in the unselected state.

Figure 16A:
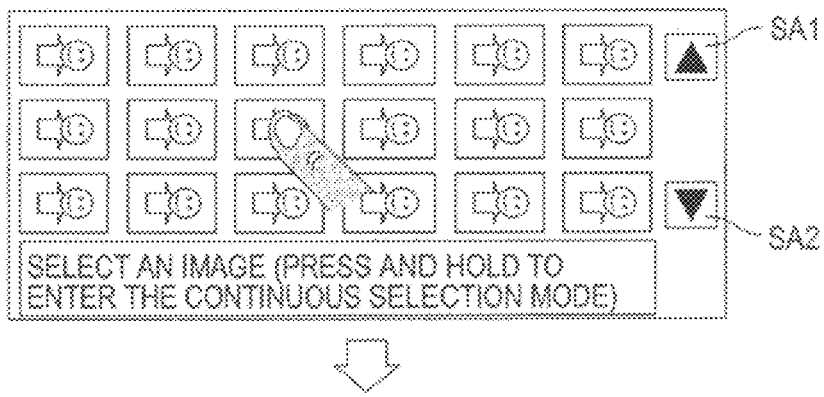
FIG. 16 is an explanatory diagram illustrating a method of selecting image files by individually touching two thumbnails displayed on the LCD.
Figure 16B:
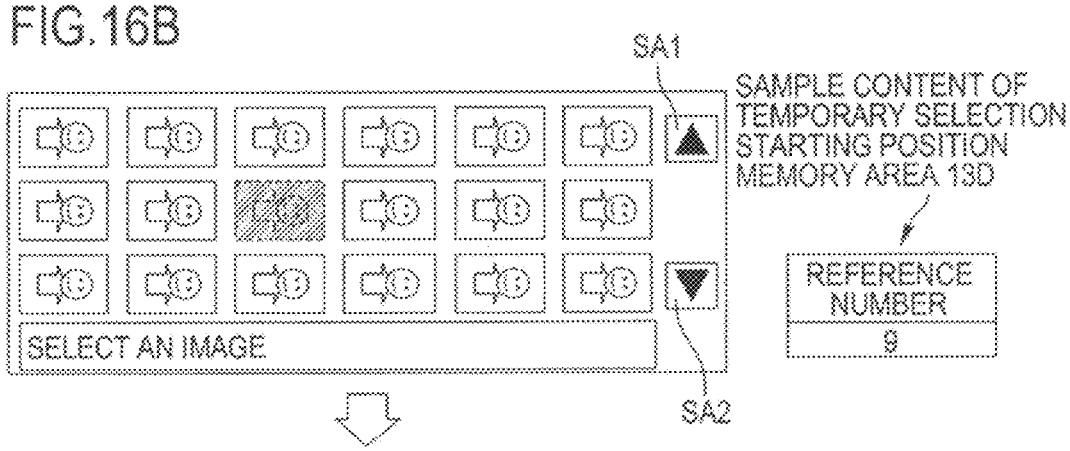

If the user touches the thumbnail at display position number "B3" for at least a prescribed interval (1 second, for example), as shown in FIG. 16A, the reference number "9" in the line of the thumbnail list having display position number "B3" is stored in both the temporary selection starting position memory area 13d and the temporary selection list memory area 13c. Hence, the thumbnail for the image file corresponding to reference number "9" stored in the temporary selection list memory area 13c is displayed on the LCD 16 in the temporarily selected state, as shown in FIG. 16B.

Figure 16C:
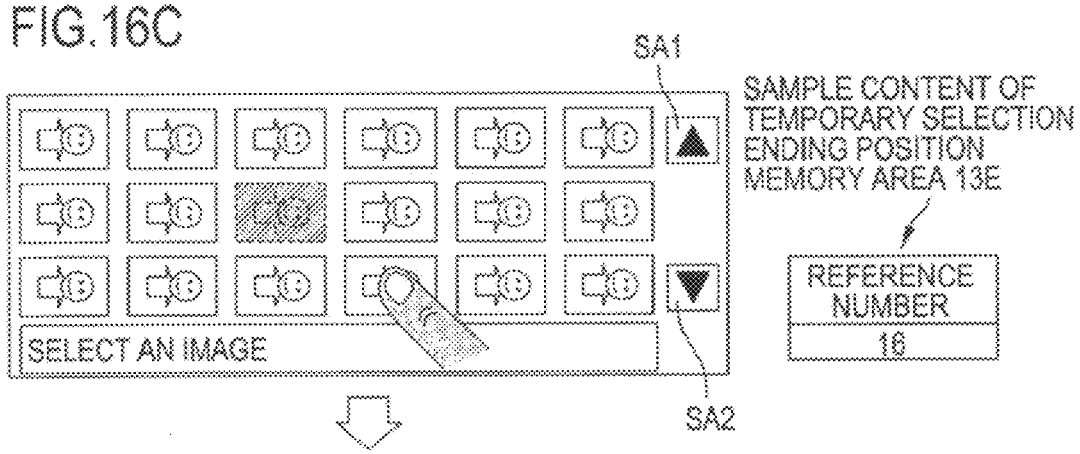

If the user then lifts the finger from the touch panel 17 and subsequently touches the thumbnail at display position number "C4", as shown in FIG. 16C, the reference number "16" in the line of the thumbnail list having display position number "C4" is stored in the temporary selection ending position memory area 13e. Accordingly, reference numbers "9-16" are stored in the temporary selection list memory area 13c.

Figure 16D:
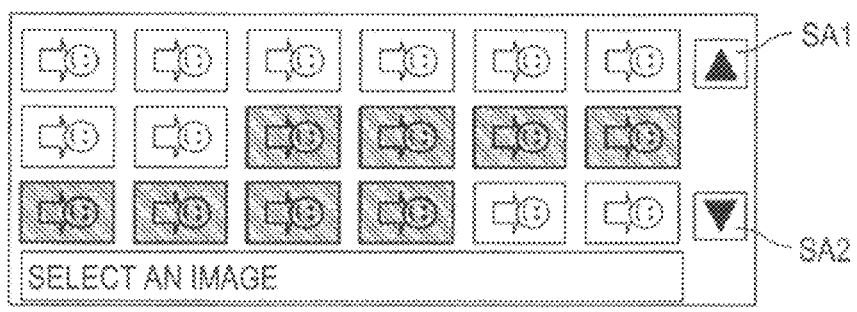
Figure 16E:
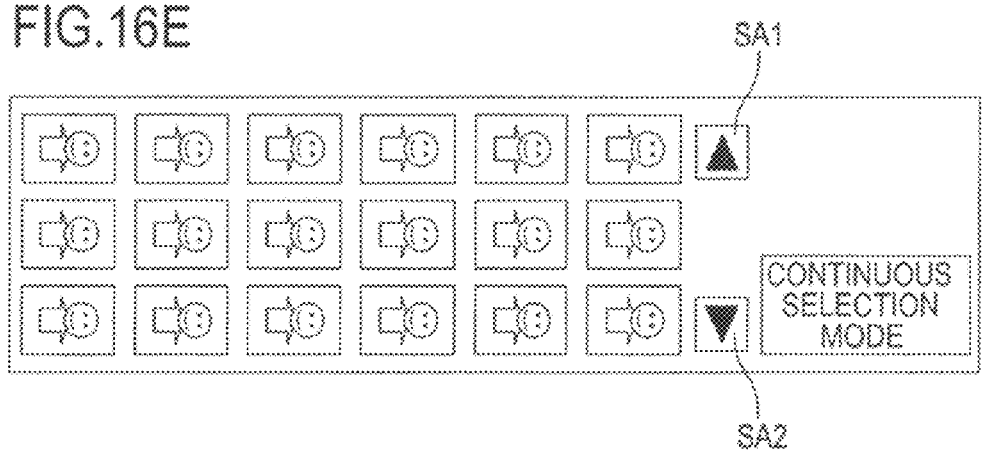

Hence, all selection status flags for reference numbers "9-16" stored in the temporary selection list memory area 13c are set to "selected" in the thumbnail list because the selection status flag for the image file corresponding to reference number "9" stored in the temporary selection starting position memory area 13d is set to "unselected" in the thumbnail list. Consequently, thumbnails for image files having a selection status flag set to "selected" are displayed on the LCD 16 in the selected state, as shown in FIG. 16D.

In the second embodiment described above, the user can perform a simple operation to touch two thumbnails individually among the thumbnails displayed on the LCD 16 to specify image files for all reference numbers ranging sequentially from the reference number of the image file corresponding to the first touched thumbnail to the reference number of the image file corresponding to the next touched thumbnail in order to select or deselect all image files within the specified range.

Here, selection status flags for all image files within the specified range are set to "selected" when the selection status flag of the image file corresponding to the first touched thumbnail is "unselected" and set to "unselected" when the selection status flag of the image file corresponding to the first touched thumbnail is "selected." In other words, the selection status flags of image files within the specified range are set based on the setting of the selection status flag associated with the image file corresponding to the first touched thumbnail, thereby making the operation simpler and more user-friendly.

While the invention has been described in detail with reference to specific embodiments thereof, it would be apparent to those skilled in the art that many modifications and variations may be made therein without departing from the spirit of the invention, the scope of which is defined by the attached claims.

For example, in the second embodiment described above, the continuous selection process of S51 shown in FIG. 15 is executed when the user presses and holds an initial thumbnail among thumbnails displayed on the LCD 16. However, it is also possible to provide a Continuous Selection Mode button on the display and execute the continuous selection process of S51 when the user touches this Continuous Selection Mode button. In the continuous selection process in this case, all image files having reference numbers ranging in succession from the reference number for the image file corresponding to the first touched thumbnail to the reference number for the image file corresponding to the next touched thumbnail are specified and all specified image files are selected or deselected.

Further, in the first embodiment described above, thumbnails for user-selected image files remain displayed on the LCD 16 in the temporarily selected state while the user's finger is in contact with the touch panel 17. However, two types or patterns of temporarily selected states may be used so that the user can visually determine whether the image files are selected or unselected. In other words, the style of the temporarily selected state of thumbnails displayed on the touch panel 17 is switched based on the selection status flag setting for the image file corresponding to the first touched thumbnail.

In both the first and second embodiments described above, image data stored in the memory card 22*a* is used as the target of selection, but the user may also select image data generated by the scanner 20 or image data acquired from a PC, external hard drive, or the like.

Further, while the MFP 1 having an image-selecting device was described in the first and second embodiments, the image-selecting device of the present invention is not limited to that in a multifunction peripheral. The present invention may also be applied to an image-selecting device provided in a digital still camera or the like.

What is claimed is:

1. An image-selecting device comprising:
a storing unit that stores a plurality of pieces of image data;
a displaying unit that displays a plurality of images based on the plurality of pieces of image data and has a plurality of display regions for each of the plurality of images;
a detecting unit that detects each of the plurality of display regions receiving direct input by an indicator;
a reading unit that reads the plurality of pieces of image data from the storing unit;
an identification data storing unit that stores identification data for identifying the plurality of pieces of image data read by the reading unit and assigns a prescribed order to the identification data;
a display controlling unit that controls the displaying unit to display the plurality of images according to the prescribed order;
an image data identifying unit that identifies each of the plurality of pieces of image data for the image displayed in the display region detected by the detecting unit; and
an image data selecting unit that, when the image data identifying unit identifies two pieces of image data among the plurality of pieces of image data, selects or deselects one image data of the two pieces of image data, the other image data of the two pieces of image data, and image data between the one image data and the other image data according to the prescribed order of the identification data;
wherein the detecting unit detects a display region corresponding to a position of direct input from the indicator on the displaying unit when the position of direct input moves on the displaying unit;
wherein the image data identifying unit comprises:
a first image data identifying unit that identifies, as first image data, image data first identified among the plurality of pieces of image data while the indicator continually applies direct input to the displaying unit; and
a second image data identifying unit that identifies, as second image data, image data last identified among the plurality of pieces of image data while the indicator continually applies direct input to the displaying unit;
wherein the image data selecting unit sets the one image data to the first image data identified by the first image data identifying unit and the other image data to the second image data identified by the second image data identifying unit;
wherein the image-selecting device further comprises:
a change detecting unit that detects whether image data identified by the image data identifying unit has changed to different image data as the position of direct input moves while the indicator continually applies direct input to the displaying unit; and
wherein the display controlling unit controls the displaying unit to display images corresponding to the first image data, image data most recently identified by the image data identifying unit, and image data between the first image data and the most recently identified image data in the prescribed order of identification data in a differing state based on the images corresponding to selected image data and unselected image data when the change detecting unit detects that the image data identified by the image data identifying unit has changed to the different image data.

2. The image-selecting device according to claim 1, further comprising:
a selection data storing unit that stores selection data for each of the plurality of pieces of image data read by the reading unit, the selection data indicating whether each of the plurality of pieces of image data is in a selected state or a deselected state by the image data selecting unit; and
a determining unit that determines whether the one image data is in the selected state or the deselected state based on the selection data;
wherein the image data selecting unit sets the one image data, the other image data, and image data between the one image data and the other image data according to the prescribed order to the selected state when the determining unit determines that the one image data is in the unselected state, and sets the one image data, the other image data, and image data between the one image data and the other image data according to the prescribed order to the unselected state when the determining unit determines that the one image data is in the selected state.

3. The image-selecting device according claim 1, further comprising
an image switching unit;
wherein the display controlling unit controls the displaying unit to display the plurality of images corresponding to the plurality of pieces of image data read by the reading unit in rows based on the prescribed order of identification data;
wherein the displaying unit has a scrolling instruction region for scrolling the plurality of images;
wherein the detecting unit detects the scrolling instruction region receiving the direct input from the indicator;
wherein the image switching unit switches the images corresponding to at least a portion of image data displayed on the displaying unit to images corresponding to another image data based on the prescribed order of identification data when the detecting unit has detected direct input from the indicator in the scrolling instruction region on the displaying unit;
wherein the image data identifying unit comprises third image data identifying unit that identifies one of the another image data as third image data, when the image switching unit has switched the images displayed on the displaying unit while the indicator is applying direct input to the displaying unit and after the first image data identifying unit has identified the first image data; and wherein the image data selecting unit sets the one image data to the first image data identified by the first image data identifying unit and the other data to third image data identified by the third image data identifying unit.

4. The image-selecting device according to claim 3, wherein the image for the one of the another image data identified by the third image data identifying unit is displayed nearest the scrolling instruction region on the displaying unit among the images corresponding to the another image data.

5. The image-selecting device according claim 1, further comprising an image switching unit;

wherein the displaying unit has first and second scrolling instruction regions for scrolling the plurality of images;

wherein the detecting unit detects the first and second scrolling instruction regions receiving the direct input from the indicator;

wherein the display controlling unit controls the displaying unit to display the plurality of images corresponding to the plurality of pieces of image data read by the reading unit in a single horizontal row in sequence based on the prescribed order;

wherein the image switching unit switches the images corresponding to at least a portion of image data displayed on the displaying unit to images corresponding to another image data based on the prescribed order of identification data when the detecting unit has detected direct input from the indicator in one of the first and second scrolling instruction regions on the displaying unit; and wherein the first scrolling instruction region is provided leftward of a right edge of the image displayed in a leftmost region of the displaying unit and the second scrolling instruction region is provided rightward of a left edge of the image displayed in a rightmost region of the displaying unit.

6. The image-selecting device according to claim 1, further comprising an image switching unit;

wherein the displaying unit has first and second scrolling instruction regions for scrolling the plurality of images;

wherein the detecting unit detects the first and second scrolling instruction regions receiving the direct input from the indicator;

wherein the display controlling unit controls the displaying unit to display the plurality of images corresponding to the plurality of pieces of image data read by the reading unit in a single vertical row in sequence based on the prescribed order;

wherein the image switching unit switches the images corresponding to at least a portion of image data displayed on the displaying unit to images corresponding to another image data based on the prescribed order of identification data when the detecting unit has detected direct input from the indicator in one of the first and second scrolling instruction region on the displaying unit; and wherein the first scrolling instruction region is provided above a bottom edge of the image displayed in a topmost region of the displaying unit, and the second scrolling instruction region is provided below a top edge of the image displayed in a bottommost region of the displaying unit.

7. The image-selecting device according to claim 1, further comprising an image switching unit;

wherein the displaying unit has first and second scrolling instruction regions for scrolling the plurality of images;

wherein the detecting unit detects the first and second scrolling instruction regions receiving the direct input from the indicator;

wherein the display controlling unit controls the displaying unit to display the plurality of images corresponding to the plurality of pieces of image data read by the reading unit in a matrix arrangement having M rows ×N columns (where both M and N are integers greater than 1), the images being arranged in the matrix continuously based on the prescribed order from one end of each row to the other end of each row, with one end of each successive row following the other end of the preceding row;

wherein the image switching unit switches the images corresponding to at least a portion of image data displayed on the displaying unit to images corresponding to another image data based on the prescribed order of identification data when the detecting unit has detected direct input from the indicator in one of the first and second scrolling instruction region on the displaying unit; and wherein the first scrolling instruction region is provided above a bottom edge of the image displayed in the first row of the displaying unit, and the second scrolling instruction region is provided below a top edge of the image displayed in the $M^{th}$ row of the displaying unit.

8. The image-selecting device according to claim 7, wherein the first scrolling instruction region is an upward scrolling region for scrolling images upward in the matrix arrangement, and the second scrolling instruction region is a downward scrolling region for scrolling images downward in the matrix arrangement, and wherein the upward scrolling region is positioned on the displaying unit rightwardly adjacent to an image arranged in the $1^{st}$ row and $N^{th}$ column or leftwardly adjacent to an image arranged in the $1^{st}$ row and $1^{st}$ column, and the downward scrolling region is positioned on the displaying unit rightwardly adjacent to an image arranged in the $M^{th}$ row and $N^{th}$ column or leftwardly adjacent to an image arranged in the $M^{th}$ row and $1^{st}$ column.

9. The image-selecting device according to claim 1, further comprising an image switching unit, wherein the displaying unit has first and second scrolling instruction regions for scrolling the plurality of images;

wherein the detecting unit detects the first and second scrolling instruction regions receiving the direct input from the indicator;

wherein the display controlling unit controls the displaying unit to display the plurality of images corresponding to the plurality of pieces of image data read by the reading unit in a matrix arrangement having M rows ×N columns (where both M and N are integers greater than 1), the images being arranged in the matrix continuously based on the prescribed order from one end of each row to the other end of each row, with one end of each successive row following the other end of the preceding row;

wherein the image switching unit switches the images corresponding to at least a portion of image data displayed on the displaying unit to images corresponding to another image data based on the prescribed order of identification data when the detecting unit has detected direct input from the indicator in one of the first and second scrolling instruction region on the displaying unit; and wherein the first scrolling instruction region is provided leftward of a right edge of the image displayed in the first column of the displaying unit, and the second scrolling instruction region is provided rightward of a left edge of the image displayed in the $N^{th}$ column of the displaying unit.

10. The image-selecting device according to claim 9, wherein the first scrolling instruction region is a leftward scrolling region for scrolling images leftward in the matrix arrangement, and the second scrolling instruction region is a rightward scrolling region for scrolling images rightward in the matrix arrangement, and wherein the leftward scrolling region is positioned on the displaying unit above an image arranged in the $1^{st}$ row and $1^{st}$ column or below an image arranged in the $M^{th}$ row and $1^{st}$ column, and the rightward scrolling region is positioned on the displaying unit above an image arranged in the $1^{st}$ row and $N^{th}$ column or below an image arranged in the $M^{th}$ row and $N^{th}$ column.

11. The image-selecting device according to claim 1, further comprising:

a continuous selection mode switching unit that switches to a continuous selection mode for identifying the two pieces of image data by the image data identifying unit;

wherein the image data identifying unit identifies, as the one image data, image data of an image displayed in a display region detected by the detecting unit while neither the one or the other image data has been identified, and identifies, as the other image data, image data of an image displayed in a display region detected by the detecting unit only when the one image data has been identified and the continuous selection mode switching unit has switched to the continuous selection mode.

12. The image-selecting device according to claim 11, wherein the continuous selection mode switching unit switches to the continuous selection mode when the indicator continues to apply direct input on the displaying unit for a prescribed interval or an interval greater than the prescribed interval, the direct input allowing the image data identifying unit to identify image data.

13. An image-selecting device comprising:

a storing unit that stores a plurality of pieces of image data;

a displaying unit that displays a plurality of images based on the plurality of pieces of image data and has a plurality of display regions for each of the plurality of images;

a detecting unit that detects each of the plurality of display regions receiving direct input by an indicator;

a reading unit that reads the plurality of pieces of image data from the storing unit;

an identification data storing unit that stores identification data for identifying the plurality of pieces of image data read by the reading unit and assigns a prescribed order to the identification data;

a display controlling unit that controls the displaying unit to display the plurality of images according to the prescribed order;

an image data identifying unit that identifies each of the plurality of pieces of image data for the image displayed in the display region detected by the detecting unit; and an image data selecting unit that, when the image data identifying unit identifies two pieces of image data among the plurality of pieces of image data, selects or deselects one image data of the two pieces of image data, the other image data of the two pieces of image data, and image data between the one image data and the other image data according to the prescribed order of the identification data;

wherein the detecting unit detects a display region corresponding to a position of direct input from the indicator on the displaying unit when the position of direct input moves on the displaying unit;

wherein the image data identifying unit comprises:

a first image data identifying unit that identifies, as first image data, image data first identified among the plurality of pieces of image data while the indicator continually applies direct input to the displaying unit; and a second image data identifying unit that identifies, as second image data, image data last identified among the plurality of pieces of image data while the indicator continually applies direct input to the displaying unit;

wherein the image data selecting unit sets the one image data to the first image data identified by the first image data identifying unit and the other image data to the second image data identified by the second image data identifying unit;

wherein the image-selecting device further comprises:

an image switching unit;

wherein the display controlling unit controls the displaying unit to display the plurality of images corresponding to the plurality of pieces of image data read by the reading unit in rows based on the prescribed order of identification data;

wherein the displaying unit has a scrolling instruction region for scrolling the plurality of images;

wherein the detecting unit detects the scrolling instruction region receiving the direct input from the indicator;

wherein the image switching unit switches the images corresponding to at least a portion of image data displayed on the displaying unit to images corresponding to another image data based on the prescribed order of identification data when the detecting unit has detected direct input from the indicator in the scrolling instruction region on the displaying unit;

wherein the image data identifying unit comprises third image data identifying unit that identifies one of the another image data as third image data, when the image switching unit has switched the images displayed on the displaying unit while the indicator is applying direct input to the displaying unit and after the first image data identifying unit has identified the first image data; and wherein the image data selecting unit sets the one image data to the first image data identified by the first image data identifying unit and the other data to third image data identified by the third image data identifying unit.

14. The image-selecting device according to claim 13, wherein the image for the one of the another image data identified by the third image data identifying unit is displayed nearest the scrolling instruction region on the displaying unit among the images corresponding to the another image data.

* * * * *